US005963205A

United States Patent [19]
Sotomayor

[11] Patent Number: 5,963,205
[45] Date of Patent: Oct. 5, 1999

[54] AUTOMATIC INDEX CREATION FOR A WORD PROCESSOR

[75] Inventor: Bernardo Sotomayor, Burnsville, Minn.

[73] Assignee: Iconovex Corporation, Hopkins, Minn.

[21] Appl. No.: 08/490,498

[22] Filed: Jun. 14, 1995

Related U.S. Application Data

[63] Continuation-in-part of application No. 08/452,174, May 26, 1995.
[51] Int. Cl.$^6$ .................................................. G06F 15/00
[52] U.S. Cl. ............................................................ 345/333
[58] Field of Search .................................... 395/774, 778, 395/761; 707/514, 515, 516, 526, 527, 528, 529, 539, 540, 541

[56] References Cited

U.S. PATENT DOCUMENTS

| 5,644,776 | 7/1997 | DeRose et al. | 395/761 |
|---|---|---|---|
| 5,649,218 | 7/1997 | Saito | 395/774 |
| 5,708,825 | 1/1998 | Sotomayer | 707/501 |
| 5,721,897 | 2/1998 | Rubinstein | 707/2 |

OTHER PUBLICATIONS

Aronson, Larry; HTML Manual of Style; 1994 Ziff–Davis Press.
Engst, et al; *Internet Starter Kit*; Second Edition; 1995 Hayden Books.
"Reflex Plus: The Database Manager—User's Guide", pp. 91–120, (1987).

*Primary Examiner*—Phu K. Nguyen
*Attorney, Agent, or Firm*—Schwegman, Lundberg, Woessner, and Kluth, P.A.

[57] ABSTRACT

Method and apparatus to enable scanning one or more documents, from within a word-processor program, wherein said method and apparatus automatically identifies key topics and phrases in a document's text, and inserts identifying tokens for the index-generation program in the word-processor to generate an index to those key topics. One embodiment provides an apparatus and method for automatically identifying semantically important key topics within an integrated word-processor environment. A document is scanned from within a word-processor program, automatically identifies significant key topics in the document, and creates and inserts index tokens for these key topics. One embodiment includes a process running in a word-processor program on a computer which (a) allows an author to select index generation for a document being processed (edited) and then, using a semantic analyzer program running on a computer, (b) automatically identifies significant key topics within the document, (c) generates and embeds index tokens into the text of the document.

15 Claims, 11 Drawing Sheets

AUTOMATIC INDEX CREATION FOR A WORD PROCESSOR

This is a continuation-in-part of Ser. No. 08/452,174 filed May 26, 1995 entitled "AUTOMATIC SUMMARY PAGE CREATION AND HYPERLINK GENERATION" by Bernardo Sotomayor.

FIELD OF THE INVENTION

The present invention relates to methods and apparatus for automatically analyzing and modifying documents, and more specifically for automatically marking key topics in documents for use in index generation.

BACKGROUND OF THE INVENTION

Document authors often provide the ability to a reader to efficiently find a topic within a document. One method to provide such an ability is to give the reader an index containing a list of key topics. A reader can use the index to identify a page number or location within the book or article, in order to obtain more detailed information. In the prior art, the author or editor of the information must manually find the key topics which might be of interest to readers, and then generate the index entry which points the reader from the index entry to the point where the topic is more fully explained.

Word processor programs facilitate index generation by allowing an author to mark an index point (often by entering a special-purpose token into the text), and the word processor thereafter can automatically generate an index by extracting every index point into an index which reflects the current page number of each respective index point. This facility greatly reduces the effort of tracking how page numbers might change as text is added or deleted, however there remains considerable manual effort in identifying which topics should be included in the index, and in adding the index-point tokens.

The term 'document' is defined in a broad sense as text and other information stored in one or more computer files. Documents include everything from simple short text documents to large computer multi-media databases.

Prior-art FIG. 1 is a conceptual drawing of a hyperlink. A hyperlink is a link between hyperlink source 72, which is located in a first data file, and hyperlink destination 74, which can be located in the same or in a second data file. Hyperlink source 72 and hyperlink destination 74 are typically displayed on computer screen 52 at different points in time. Three elements that comprise a hyperlink are:

(a) hyperlink source 72, which specifies a key topic to be displayed in a hot area. A 'hot area' is a portion of the display screen that, if pointed at and clicked on, will cause the computer to execute computer code such as a hyperlink program 79 which hyperlinks (i.e., causes a branch) to a hyperlink destination 74. (Typically, the hot area is visually indicated by highlighting, such as color, a bold font, blinking or underlining, but it may contain an icon, picture graphic, or other visual indication.)

(b) hyperlink destination 74, which includes information, (e.g., destination location specification 73) specifying the location of the text or picture that will be displayed if the hyperlink is taken. Destination location specification 73 for hyperlink destination 74 is generally stored in the data file containing hyperlink source 72. Hyperlink destination 74 itself can be either in the same or a different data file as hyperlink source 72.

(c) hyperlink computer code 79 that, in response to a 'viewer action', causes hyperlink destination 74 to be displayed in the context in which it appears. Typically, that 'viewer action' comprises a viewer clicking on the hyperlink source 72. 'Clicking' is defined as pointing with and activating pointing device 54 at a hot area, such as hyperlink source 72. A pointing device can include a mouse, joystick, or other device that is used to select a location on a computer screen and is activated by, for example, depressing a switch such as a mouse button 59, or otherwise indicating that the computer should execute hyperlink code 79. Upon activation, hyperlink code 79 uses destination location specification 73 to locate hyperlink destination 74, and to display that information.

Another technology which is relevant to the present invention is the automatic semantic analysis of text to identify and extract key topics for indexing. One exemplary kernel incorporating this semantic analysis technology, the Syntactica Engine available from Iconovex Corporation, assignee of the present invention, does a syntactic analysis of the text of a document and then uses a "lexicon dictionary" (also called a "lexicon") which specifies semantic weights assigned to the words in the text reflecting their value as index entries. A computer program uses the synthesized values, or semantic weights, for words to qualify phrases as key topics. A user is able to specify a threshold value so that the computer program could select only those phrases greater than, or equal to, that specified threshold value as key topics. Known semantic-analysis computer programs are not available as integrated features in word-processing programs.

A significant problem with generating information for word-processor-based index-generation systems is that the author must review the material to be indexed, must identify key topics to which to index, and must set up the index-point tokens. This is a time-consuming and labor-intensive process.

SUMMARY OF THE INVENTION

What is needed, and what the present invention provides, is a system and method that automatically identifies key topics and phrases in a document's text, and inserts identifying tokens for the index-generation program in the word-processor to generate an index to those key topics. In particular what is needed is an apparatus and method for automatically identifying semantically important key topics within an integrated word-processor environment. The present invention scans a document from within a word-processor program, automatically identifies significant key topics in the document, and creates and inserts index tokens for these key topics.

One embodiment of the present invention includes a process running in a word-processor program on a computer which (a) allows an author to select index generation for a document being processed (edited) and then, using a semantic analyzer program running on a computer, (b) automatically identifies significant key topics within the document, (c) generates and embeds index tokens into the text of the document.

BRIEF DESCRIPTION OF THE DRAWINGS

In the following detailed description of the invention, reference is made to the accompanying drawings which form a part hereof, and in which is shown by way of illustration only, specific exemplary embodiments in which the invention may be practiced. It is to be understood that other embodiments may be utilized, and structural changes may be made, without departing from the scope of the present invention.

DETAILED DESCRIPTION OF THE PREFERRED EMBODIMENT

Figure 1:
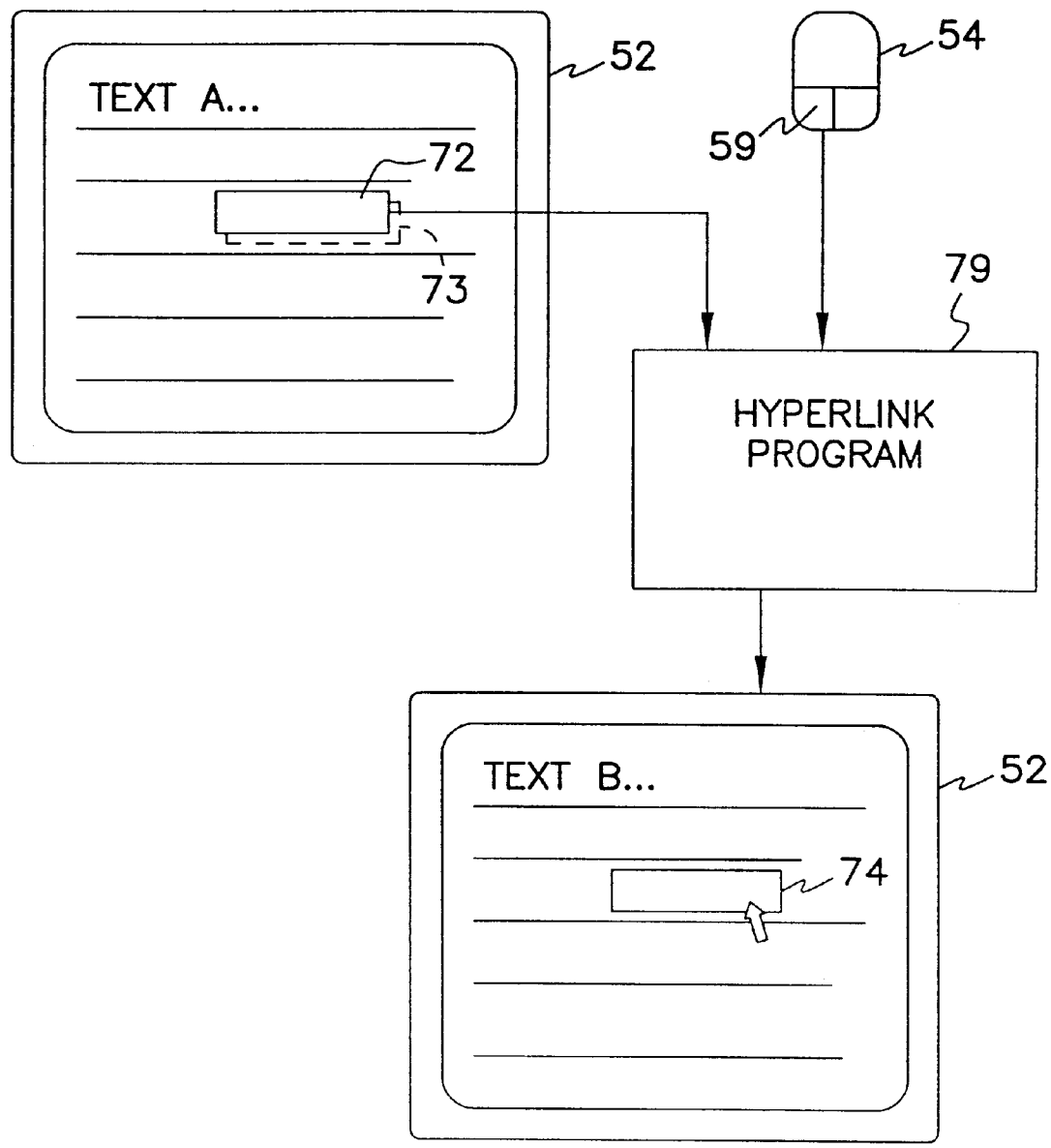
FIG. 1 shows a conceptual drawing of a single prior-art hyperlink.

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

An 'anchor' is defined as a word, phrase, or graphic (for example, one that might likely be used to locate information of interest) which is 'anchored' to its location within the context of the file data, as opposed to being fixed to a specific numerical address within the file. The source and destination ends of hyperlinks for the present invention are coupled to anchors so they are anchored to a specific portion of text or to a specific icon or picture displayed on a computer screen, rather than being associated with a specific address in a file. Thus, the anchor remains with the same piece of data when information is inserted in or deleted from the file, whereas the specific address of that piece of data may change.

The American Heritage dictionary begins its definition of 'index' as "something that serves to guide, point out, or otherwise facilitate reference . . . " The term 'index entry' is defined to include a term or phrase, with information as to the location where more information regarding that index entry can be found. The term 'index' is defined as a grouping or listing of index entries. An index is often ordered in some manner, for example by alphabetization. Hypermedia applications usually include text, and often also include pictures, icons, graphics, animations, sound, and video (movies).

A 'web browser' is traditionally defined as a computer program which supports the displaying of documents, which include Hypertext Markup Language (HTML) formatting markup tokens (discussed further below), and hyperlinking to other documents, or phrases in documents, across a network. In particular, web browsers are used to access documents across the Internet's World Wide Web. The discussion of present invention defines both 'web browser' and 'browser' to include browser programs which enable accessing hyperlinked information over the Internet and other networks, as well as from magnetic disk, CD-ROM, or other memory, and does not limit web browsers to just use over the Internet. Several Internet web browsers are available, some of them commercially. Two of the best known of these, Mosaic and Netscape Navigator are described in *Internet Starter Kit* by Adam Engst, Corwin Low and Michael Simon, Second Edition, Hayden Books, 1995. Any viewer of the World Wide Web will typically use a web browser. Indeed, a viewer viewing documents created by the present invention normally uses a web browser to access the documents that a database provider may make available on the network. Web browsers allow clicking on hot areas (generated by source anchors containing a document reference name and a hyperlink to that document) so that clicking on the hot area causes the specified document to be downloaded over the network and displayed for the viewer. Most web browsers also maintain a history of previously used source anchors and display a hot area which allows hyperlinking back to the database provider's home page (or back through the locations the viewer has previously "visited") so the viewer can always go back to a familiar place.

What makes a web browser on a network such as the Internet so powerful is that any of the documents viewed with the program may be located (or scattered in pieces) on any computer connected to network 400. The viewer can use a mouse, or other pointing device, to click-on a hot area, such as highlighted text or a button, and cause the relevant portion of the referenced document to be downloaded to the viewer's computer 411 for viewing. These downloaded documents in turn can contain hyperlinks to other documents on the same or other computers. 'Downloading' is defined as the transmitting of a document or other information from the database provider's computer 413 (or from an author's computer 412) over a network 400 to the viewer's computer 411 (see FIG. 2A). FIG. 2B shows a prior-art CD-ROM drive connected to a computer.

Figure 6A:
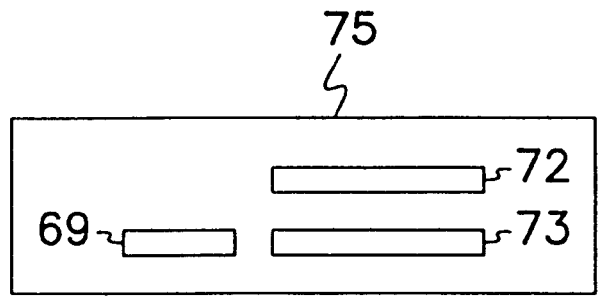
FIG. 6A, 6B, and 6C show a conceptual drawings of source anchor 75, destination anchor 76, combination anchor 67.
Figure 6B:
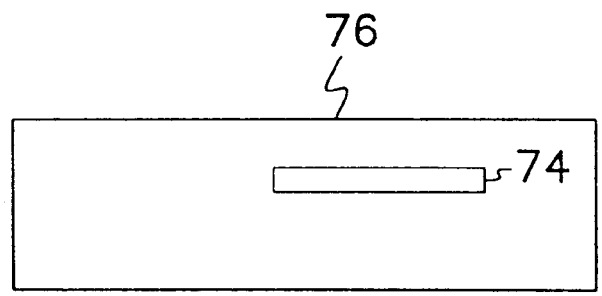
Figure 6C:
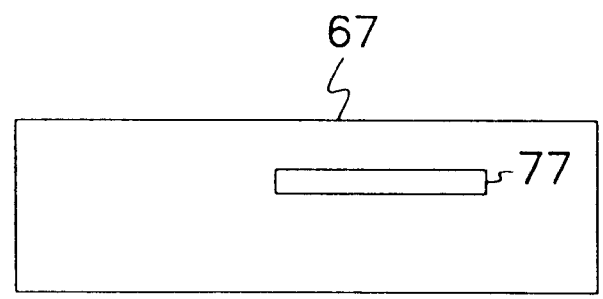

A 'source anchor 75' shown in FIG. 6A is an anchor which is combined with a hyperlink source 72 and, typically, an index term 69. The index term 69 conveys information regarding a key topic to a viewer. The index term 69 is generally highlighted as a hot area to indicate to a viewer that a hyperlink is available. Alternative embodiments replace the index term 69 with an icon or graphic. A destination anchor 76 shown in FIG. 6B is an anchor placed in a file at a hyperlink destination 74. A source anchor 75 typically contains the name of the destination anchor 76 stored in destination location specification 73 in order that a web browser can find and hyperlink to the hyperlink destination 74. Combination anchor 67 shown in FIG. 6C is an anchor which is combined with a combination hyperlink 77 (which comprises both a hyperlink source 72 and a hyperlink destination 74). In one embodiment, combination anchor 67 is implemented by using a source anchor 75 in close proximity to a destination anchor 76.

Information is presented to World Wide Web viewers as a collection of 'documents' and 'pages'. As mentioned above, a 'document' is defined in a broad sense to indicate text, pictorial, audio, video and other information stored in one or more computer files. Viewing such multimedia files can be much like watching television. Documents include everything from simple short text documents to large computer multi-media databases.

A 'page' is defined as any discrete file which can be downloaded as a single download segment. Technically, a web browser does not recognize or access documents per se, but instead accesses pages. Typically, one page is downloaded by a web browser as the result of clicking on a hot area. A page often has several source anchors 75 with hyperlinks to various other pages or to specific locations within pages.

One problem with accessing documents over the Internet is that many documents are quite long, and thus can take quite some time to download over the network. This means that viewers are often reluctant to access a document unless they know it will be useful. The present invention facilitates dividing documents into a plurality of pages which can be efficiently chosen by a viewer and downloaded, one page at a time, and only when the particular page desired is referenced. A page is thus a document which contains a portion of a source document. A source document is a document from which derivative documents (such as pages) are produced. The source document could be reconstructed from the pages generated from the source document.

A 'summary page' is defined as an overview-type page containing summary information about another document (or a set of documents, if desired) and one or more hyperlinks to that other document.

A 'presentation page' is defined as a page containing a portion or segment of a larger source document. Presentation pages provide conveniently sized pieces of the larger source document which are downloaded one at a time (rather than downloading the entire source document), typically as a result of a hyperlink the viewer wants to take into the corresponding portion of the source document.

From the point-of-view of a web browser program, presentation pages and summary pages are technically indistinguishable. However, summary pages are normally documents that are designed by people to contain hyperlinks to presentation pages (or to other summary pages), and are designed for use on the World Wide Web. In the context of the present invention, summary pages are also used to help navigate through information contained on a CD-ROM.

An 'entry page' is defined as a summary page that has been assembled by a person or computer as an entry point to hyperlink to other summary pages and presentation pages of interest. Note, however, that any page, including summary pages and presentation pages can be accessed and/or downloaded directly, without having to go through an entry page.

A 'home page' is defined as an entry page used by a database provider to provide an overview of other pages and/or documents available through the system associated with the home page. A home page often contains a trademark and other flashy pictorial or aesthetic information identifying the database provider. The viewer normally begins by clicking on one of the hot areas on a home page which the World Wide Web uses as an entry page to the information a database provider presents. The viewer likely starts to trace through a web of hyperlinks to a series of various documents on various computers on a network. (Hence the term World Wide Web.)

To support the Internet and the World Wide Web, a markup language called Hypertext Markup Language (HTML) has been developed. HTML has two major objectives. First, HTML provides a way to specify the structural elements of text (e.g., this is a heading, this is body text, this is a list, etc.) using tokens which are independent of the content of the text. A web browser uses these tokens to format the displayed text for the particular display device of a particular viewer. So, for example, HTML allows an author to specify up to six levels of heading information bracketed by six different heading-token pairs. Applications (e.g., web browsers) on different computers then process the HTML documents for visual presentation in a manner customized for particular display devices. An application on one computer could display a level 1 heading as 14 point bold Bodini, while an application on another computer could display it as 20 point italic Roman. A level 1 sequence is heralded with the sequence token <h1> and terminated with the token </h1>. Thus, a heading might be encoded as might be displayed as:

<h1> This is a level 1 heading </h1>
for a level one heading or
    <h6> This is a level 6 heading </h6>
for a level 6 heading. As a markup language, HTML enables a document to be displayed within the capabilities of any particular display system even though that display system does not support italic, or bold, color, or any particular typeface or size. Thus, HTML supports writing documents so they can be output to everything from simple monospaced, single-size fonts to proportional-spaced, multiple-size, multiple-style fonts. Each computer program that accesses an HTML document can translate that HTML document into a display format supported by the hardware it will run on.

The second and more important aspect of HTML, for the purposes of the present invention, is that it provides a mechanism to incorporate hyperlinks within a single document and between documents located at different nodes on the Internet. These hyperlinks can contain addresses of documents anyplace on the Internet. HTML is described in *The HTML Manual of Style* by Larry Aronson, Ziff Davis, 1994.

Figure 3:
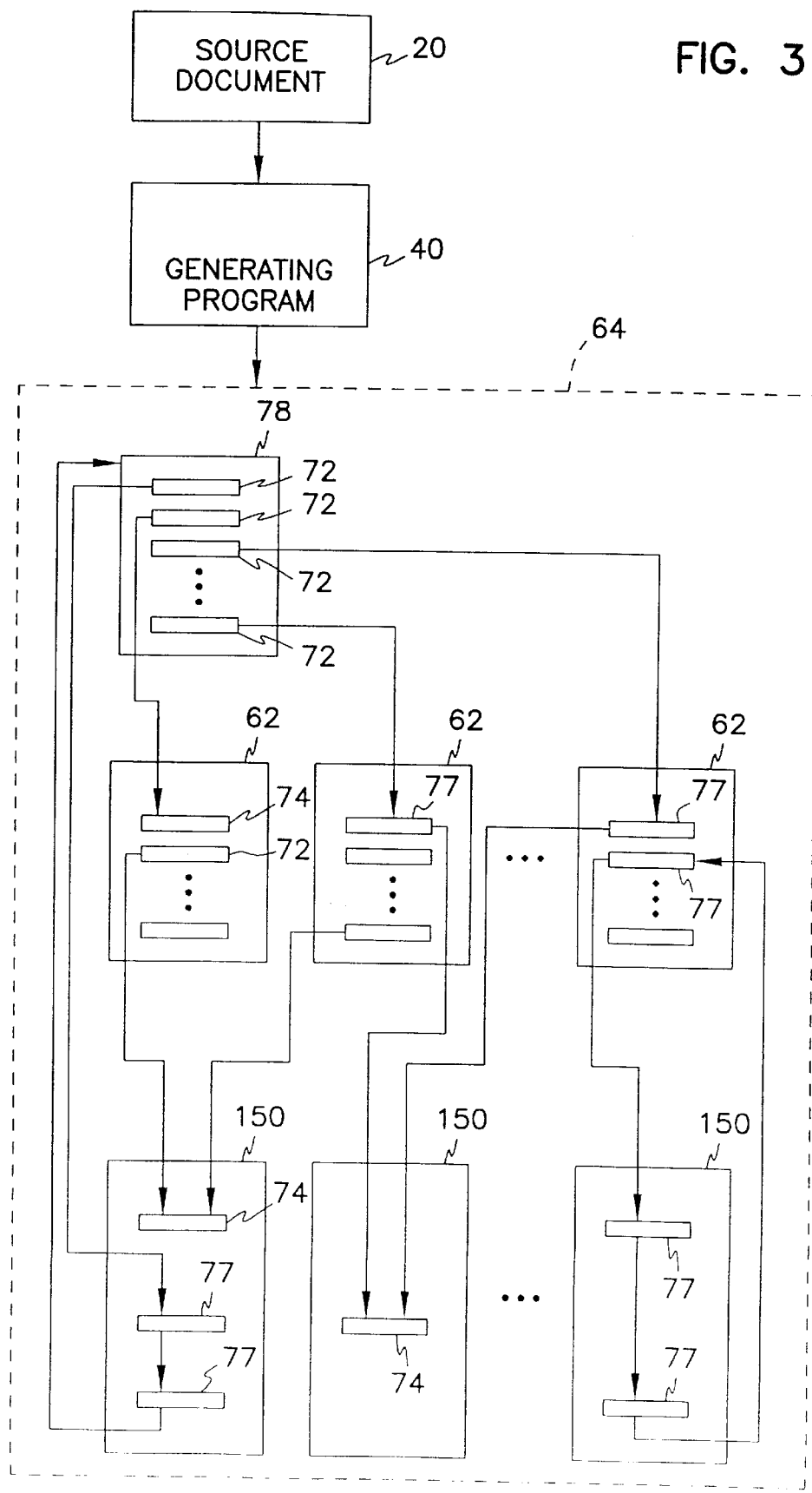
FIG. 3 shows the flow from source document 20 through summary page generator 40 to resultant documents.

FIG. 3 shows the flow from source document 20 through summary page generator 40 to resultant documents 64. In its most general form, summary page generator 40 is a program running on a computer which automatically analyzes textual data in a source document 20, and using weighting rules determines from the textual data what are the most significant phrases (i.e., strings of words), and generates a presentation page 150 which contains textual data from source document 20 plus special codes embedded in that textual data, the codes which specify to another program (generally a browser) where those significant phrases are.

Summary page generator 40 is typically a computer program that processes one or more source documents 20 to produce one or more output summary pages 62, and optionally, produces entry page 78 and divides source document 20 into a plurality of presentation pages 150. In one embodiment, summary page generator 40 runs on an IBM-compatible personal computer.

In one embodiment, a typical summary page 62 contains key-topic index entries that include hyperlinks to destination anchors where those key topics appear in the presentation pages 150 generated from source document 20. Various types of summary pages 62 are created, for example, separate summary pages can be created which contain a table-of-contents, a concept index, a phrase index, or an abstract index, respectively. In one embodiment, summary page generator 40 also generates an entry page 78 which contains source anchors 75 having hyperlink sources 72 to the various summary pages 62, and in one embodiment, optionally to presentation pages 150. In an alternative embodiment, summary page generator 40 combines all the summary pages 62 on a single summary page 62. A key topic index entry is an index term 69 for the key topic and an associated source anchor 75 or combination anchor 67 that are typically hyperlinked to occurrences of that key topic in the source documents 20 or their derivative documents (i.e., presentation pages 150).

The viewer begins navigating a document or database of documents starting at an entry page 78, and from there, hyperlinking to one of several summary pages, which in turn hyperlink to presentation pages, where data from the actual source documents are displayed for the viewer. In some cases, such as a key-phrase summary page 100 which contain hyperlinks to an abstract summary page 140, one summary page 62 will hyperlink to another summary page 62.

A summary page 62 could fit on a single computer display screen, or could be tens of thousands of lines of text which are scrolled, as in a word processor. In one embodiment, presentation pages 40 are derivative versions of source document 150 that contain embedded hyperlinks inserted by summary page generator 40.

In another embodiment, source document 20 is its own presentation page 150, especially if source document 20 already contains hyperlinks and/or hyperlink destinations inserted by an author before being processed by summary page generator 40.

Figure 4:
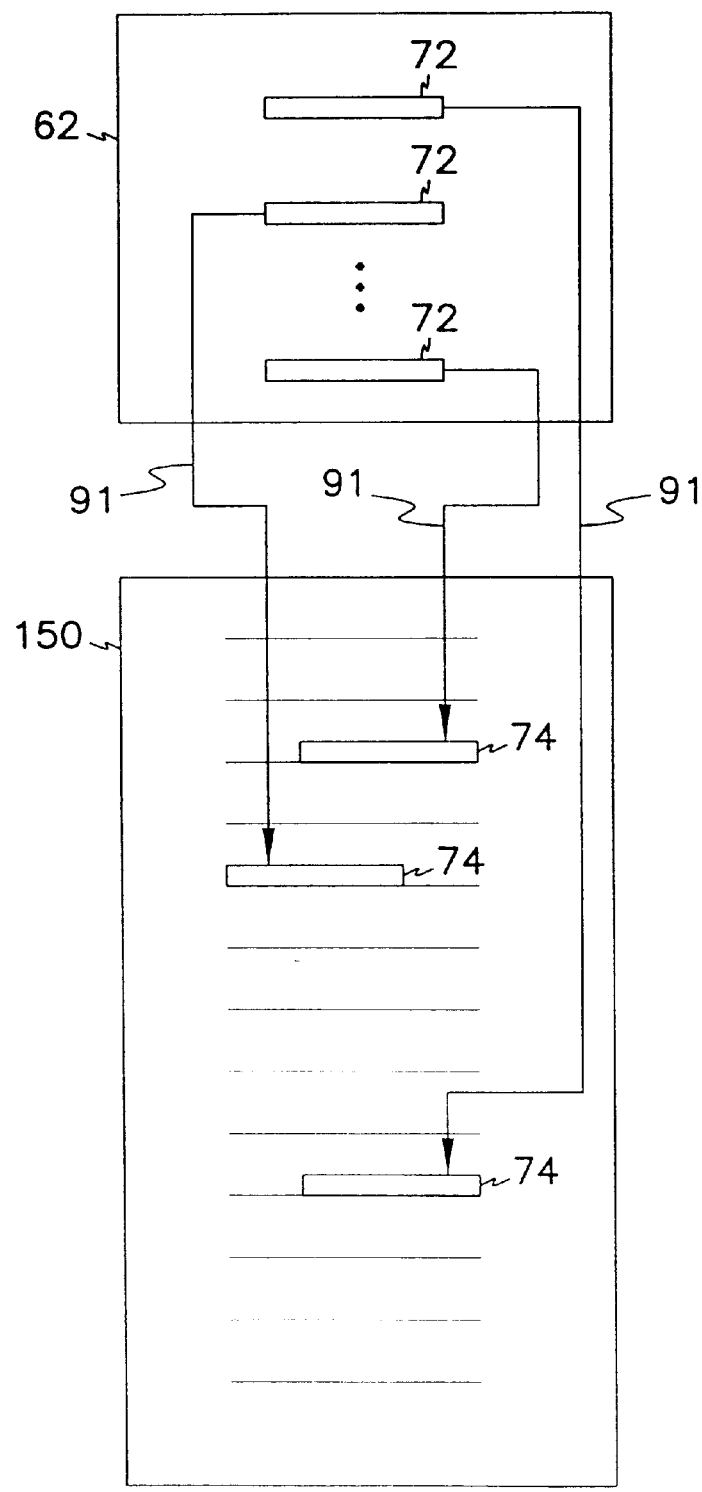
FIG. 4 shows a conceptual drawing of vertical hyperlinking.

There are three kinds of hyperlinks that can be generated:

Vertical hyperlinks: Vertical hyperlinks 91 are single-hop hyperlinks as shown in FIG. 4. Each vertical hyperlink 91 hyperlinks to one instance of a key topic in the presentation pages. As many hyperlink source anchor entries 72 for vertical hyperlinks 91 are created in summary page 62 for a key topic as there are instances of that key topic in the presentation pages 150.

In one embodiment, summary page generator 40 locates each significant instance of a key topic by using semantic analysis on source documents 20.

Figure 5A:
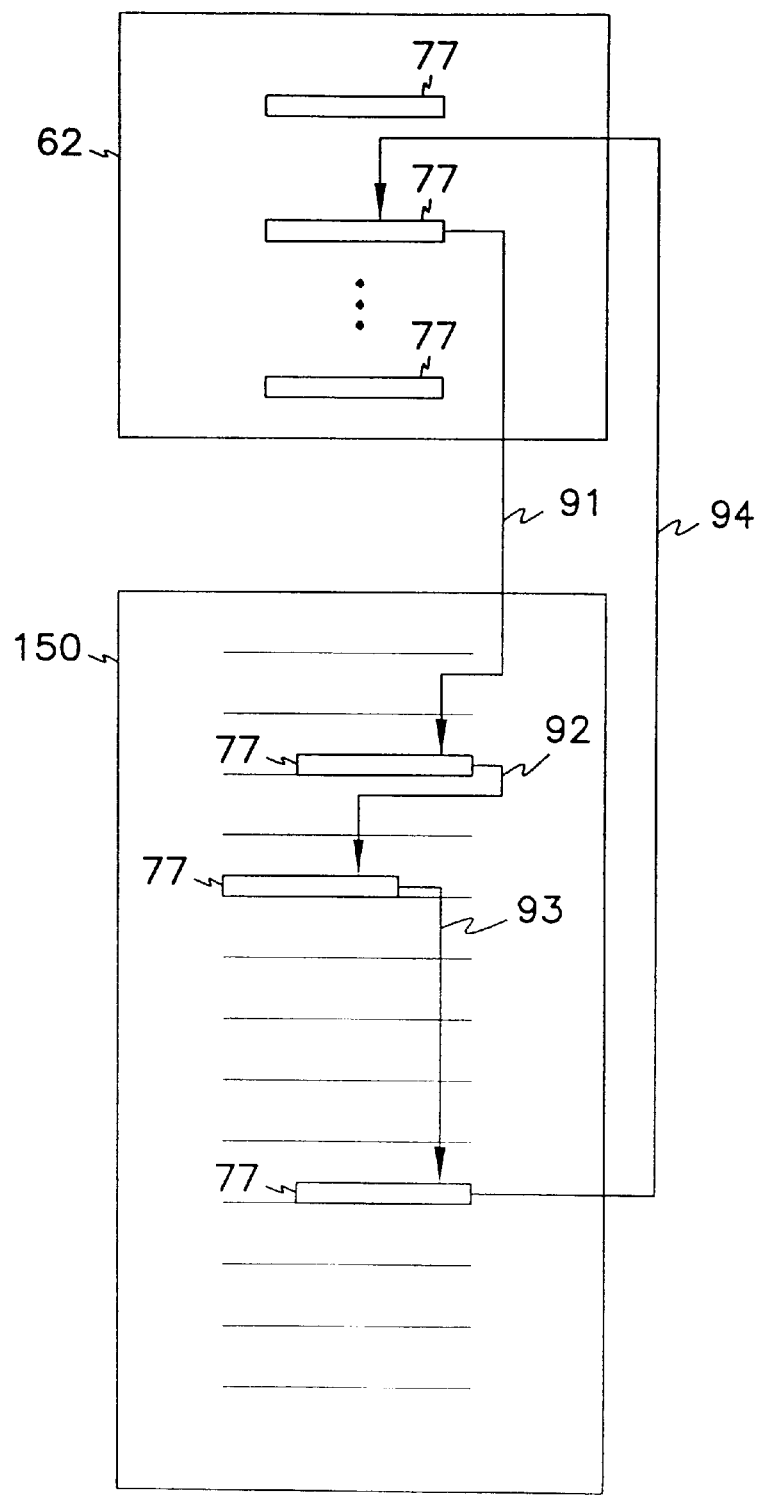
FIG. 5A shows a conceptual drawing of circular hyperlinking.

Circular hyperlinks: When circular hyperlinks are generated, only one combination anchor entry 67 is created in summary page 62 for each key topic, no matter how many times that key topic appears in presentation pages 150. That combination anchor entry 67 is circularly hyperlinked through all the instances of that key topic in the presentation pages 150. FIG. 5A shows a conceptual schematic of a circular hyperlink starting at combination anchor entry 67 in summary page 62 and hyperlinking through each combination anchor 67 in presentation page 150, each of which, being a combination anchor 67 in a circular hyperlink chain, is both a source anchor and a destination anchor. The combination anchor entry 67 on summary page 62 allows vertical hyperlink 91 to the first instance of that key topic in presentation page 150, which in turn through the key topic's combination anchor 67 allows hyperlink 92 to the second instance which allows hyperlink 93 to a third instance of the key topic, and so on, until the final instance of the key topic allows hyperlink 94 back to the combination anchor entry 67 in the summary page 62.

In an alternative embodiment, the final instance of the key topic allows a hyperlink back to the first instance of the key topic in the presentation page rather than to the summary page. The preferred embodiment uses hyperlinking back through the summary page, since this function gives the viewer visual feedback every time the viewer completes a hyperlink cycle.

One embodiment of the present invention is included in the AnchorPage™ program by the assignee of the present invention.

Circular hyperlinks are an alternative to non-circular hyperlinks, which have the advantage of making the navigation to all instances of a key topic easier and/or faster, thus reducing the number of entries in a summary page by allowing a single entry per key topic in the summary page, rather than one entry for each instance of the key topic in the presentation pages.

Figure 5B:
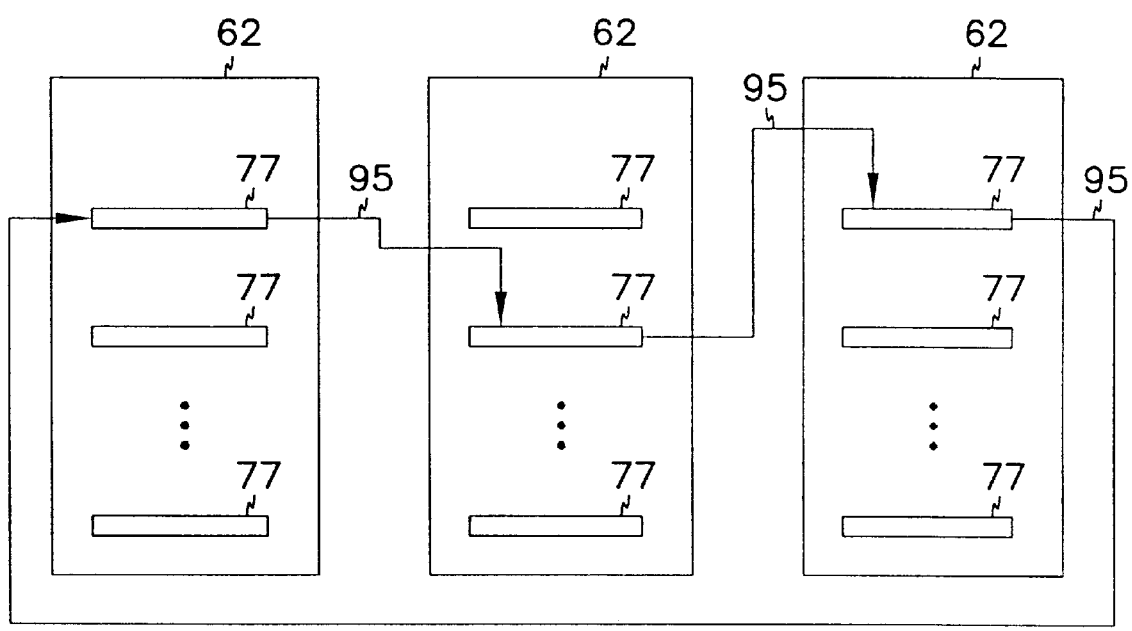
FIG. 5B shows a conceptual drawing of horizontal hyperlinking.

Horizontal hyperlinks: FIG. 5B shows horizontal hyperlinks 95. Horizontal hyperlinks 95 are hyperlinks from a key-topic entry in one summary page 62 to instances of the same key-topic entry in other summary pages 62, typically from a brief key-topic entry such as a key-phrase entry, to a more-detailed entry such as an abstract entry. Although horizontal hyperlinks 95 need not be circular, the horizontal hyperlinks 95 shown in FIG. 5B are circular hyperlinks that hyperlink through combination anchors 67. In one embodiment, summary page generator 40 scans all the summary pages for key topics and inserts horizontal hyperlinks 95 to those key topics in the summary pages.

In one embodiment, only one of horizontal hyperlinks or vertical hyperlinks can be selected as being circular hyperlinks. However, in another embodiment both types are selected as circular, and two sets of circular hyperlink could cycle through the same summary page list entry. In yet another embodiment a separate icon for horizontal hyperlinks is eliminated and each circular hyperlink cycles through both the presentation pages and the summary pages.

In one embodiment, since both horizontal hyperlinks and vertical hyperlinks are used, a horizontal hyperlink icon appears near the source anchor so the viewer can either click on the highlighted key topic term in the source anchor to hyperlink through vertical hyperlinks or click on the horizontal hyperlink icon to hyperlink through horizontal hyperlinks.

When circular hyperlinks are used, a combination anchor 67 such as shown in FIG. 5A, is both a source anchor and a destination anchor, so there are, in effect, three forms of embedded hyperlinks: Source, Destination and Combination. A source anchor 75 specifies a hot area to be highlighted and the name of the location in a document to which to hyperlink. A destination anchor 76 specifies the name of a place in a document in order that a hyperlink can go to that destination place. A combination anchor 67 contains both source anchor and destination anchor types of information and is described now in more detail.

A combination anchor 67 is a destination anchor that ends one hyperlink combined with a source anchor that begins another hyperlink.

The verb 'to hyperlink' is defined as the clicking on a source anchor to go to a destination anchor, and includes following down a chain of hyperlinks by continuing to click on combined anchors.

To generate a combination anchor 67, summary page generator 40 embeds a hyperlink which (a) identifies index term 69 for the key topic in order that the key topic term can be highlighted as in a hot area, (b) specifies a name for destination anchor 76 for the combination anchor, in order that the combination anchor can be found and hyperlinked to as a destination, and (c) specifies destination location specification 73, used to find the location in a document to which to hyperlink when the hot area is clicked on.

If the text in which one wanted to embed a hyperlink is, "One should identify the essence of the idea if one wants to think clearly.", and the key topic term is "the essence", then in order to insert a combination anchor 67 comprising a destination anchor 76 and a source anchor 75, summary page generator 40 changes the text to be:
One should identify <A NAME="DEF34876"></A><A HREF="#GEN03789"> the essence</A> of the idea if one wants to think clearly.

The above is a typical HTML format. "<A . . . >" defines the beginning of an anchor and "</A>" terminates that anchor and so defines the area where the intervening text is displayed to be a hot area that should be highlighted so that a mouse click or other input device activates the hyperlink. The phrase NAME="DEF34876" defines the name of the destination anchor 76 within the document in order that a hyperlink to the destination can find the destination. The phrase HREF="#GEN03789" provides the destination location specification 73 used as a destination reference name which the web browser will hyperlink to if the highlighted area is clicked on or otherwise activated. Here "DEF34876" and "GEN03789" are arbitrary generated names, but could just as well be "CAT" or "DOG". Where a hyperlink is to another document, the name of that document precedes the "#", so for example the hyperlink:

HREF="http://www.myserver.com/user1/project2#GEN03789" would hyperlink to the label name GEN03789 in the document user1/project2 at the server computer at the network address http://www.myserver.com.

The just-described method is only one embodiment of hyperlinks. In another embodiment, for example, at the beginning or end of each document there could be a table of hyperlink numbers or names along with the location within the document where the source anchor associated with the table entry is located.

Figure 8:
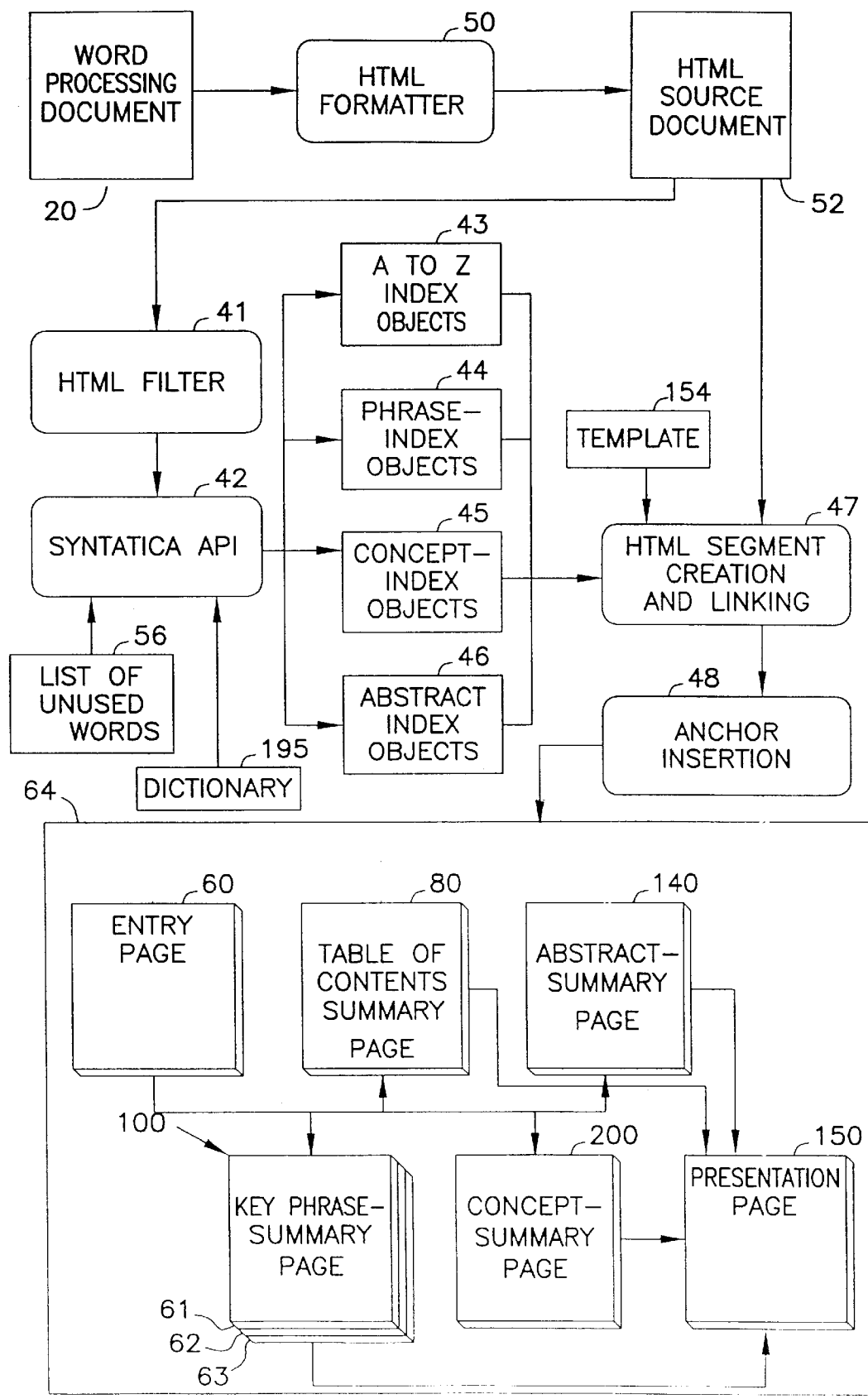
FIG. 8 shows a conceptual drawing of the entry page, summary pages, and presentation pages generated by the present invention along with hyperlinks between them.

Entry to the plurality of presentation pages 150 that summary page generator 40 generates is typically through a hyperlink from an entry page 78 which the database provider likely will define as their home page. The viewer uses a mouse or other pointing device to click on a highlighted hot area of source anchor 72 in entry page 78 that hyperlinks to one of the summary pages 62. One embodiment, shown in FIG. 8, provides four types of summary pages 62: an abstract summary page 140, a concept summary page 200, a key-phrase summary page 100 and a table-of-contents summary page 80. Each of these summary pages 62 contains a list of key-topic-entry hyperlink anchors. These hyperlink anchors may be used for vertical hyperlinks (such as vertical hyperlink 91 of FIG. 5A) or horizontal hyperlinks (such as horizontal hyperlink 95 of FIG. 5B) referred to earlier, and they may be circular or not.

Abstract summary page 140 comprises a list of abstracts (high semantic content sentences are treated as 'abstracts'; in one embodiment, abstracts whose semantic content exceed the threshold value that the author selected will be listed in the abstract summary page 140 in the order in which they occurred in the text) automatically derived by summary page generator 40. Concept summary page 200 comprises a list of concepts (wherein 'concepts' are noun phrases or noun-verb phrases that contain high-semantic-weight words; in one embodiment, the above-mentioned list of abstracts is generated; each abstract is then examined to determine all key topics; for each determined key topic, a copy of the abstract is made and 'rotated' so the key topic appears first to make the 'concept' (thus several concepts can be generated from each abstract); the list of concepts is then alphabetized) automatically derived by summary page generator 40. Key-phrase summary page 100 comprises a list of key phrases (key phrases are phrases with a high semantic weight; the key phrase is rotated so that the first word will be the highest semantic weight noun, since this is the word a person normally looks up) automatically derived by summary page generator 40. Table-of-contents summary page 80 comprises a table of contents (generated from the heading tokens inserted into source document 20 by its author) automatically derived by summary page generator 40.

In one embodiment, both the input (e.g., source document 20) and output documents 64 for summary page generator 40 must be HTML documents, and so may contain hyperlinks to other documents on other Internet computers. In another embodiment, shown in FIG. 8, an HTML formatter 50 is used to convert a word-processor document 20 into an HTML source document 52. An important feature of this embodiment of summary page generator 40 is that the output documents 64 generated are compatible with standard HTML documents. Thus all of the tools and user experience on dealing with HTML documents can be used with both input and output documents for summary page generator 40 and an author can customize their documents for summary page generator 40 as they would any other HTML document.

The pages (i.e., output documents 64) output from summary page generator 40 will normally be viewed with a web browser which makes use of the HTML markups.

Figure 7:
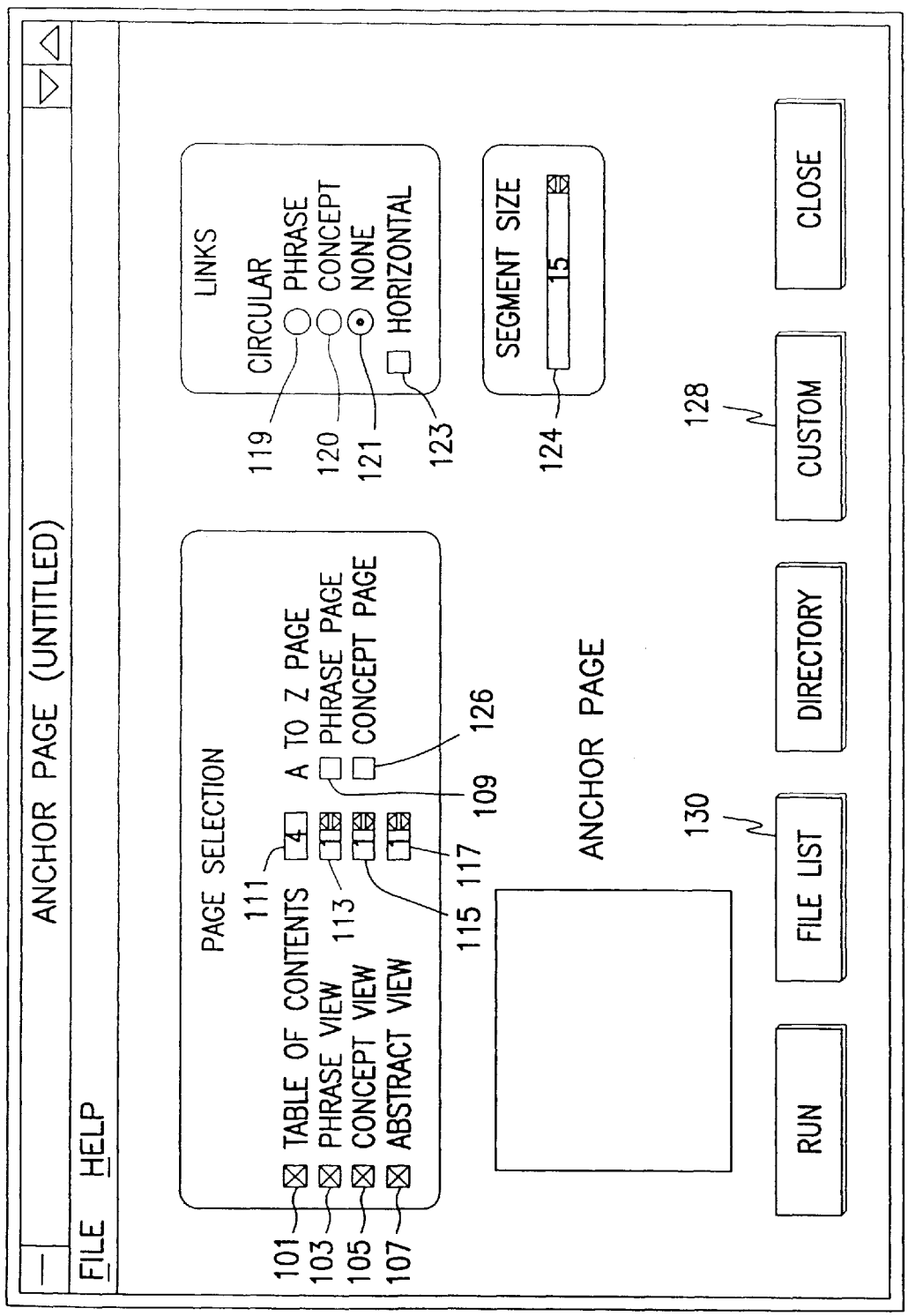
FIG. 7 shows the opening screen of one embodiment of the present invention.

The AnchorPage™ program of Iconovex Corporation provides one exemplary embodiment of summary page generator 40. When one such embodiment is run, a screen similar to that shown in FIG. 7 is presented. This screen allows selection of which of the four summary pages to be generated. Generation of table-of-contents summary page 80 is selected by clicking on option box 101; a key-phrase summary page by clicking on option box 103; a concept summary page 200 by clicking on option box 105; and a abstract summary page 140 by clicking on option box 107. A threshold level is also selected (if only by default) for each summary page selected. Spinner 111 specifies number of levels (from 1 to 6) of heading tokens to use to generate on the table-of-contents summary page 80; spinner 113 specifies the density of phrases to compile for the key-phrase summary page 100; spinner 115 specifies the density of concepts to generate for concept summary page 200; and spinner 117 specifies the density of abstracts to generate for the abstract summary page 140. The author may also make a selection of hyperlinks, and may select one of the following: circular hyperlinks for phrase references at radio button 119, concept references at radio button 120, or no circular hyperlinks at radio button 121. The author may also select horizontal hyperlinks by clicking on option box 123. The user may activate "A-to-Z pages" for phrase summary pages at option box 109 or for concept summary pages 200 at option box 126. The user may also select (if only by default) a segment size at spinner 124, and may select other options by clicking at custom button 128.

When an author uses summary page generator 40, they select (at block 130 in FIG. 7) one or more documents to process. In one embodiment, these documents will typically appear in a single directory but can be in several different directories on the author's computer. Documents from elsewhere on the Internet are first downloaded to the author's computer, and then processed by summary page generator 40. In another embodiment, documents can be selected from any place on the Internet for processing by summary page generator 40. So, for example, the author could theoretically select a set of documents, some of which came from a computer at Munich, Germany, others from a computer in Osaka, Japan, and others from the author's own computer. The resulting presentation pages 150 and summary pages 62 output by summary page generator 40 contain the embedded hyperlinks that make the location of various documents transparent to the viewer. All of the generated documents or pages or the segments thereof are transmitted over the network 400 to a viewer computer 411 as needed by the viewer.

The author can activate special lexicon dictionaries of medical, business, legal, geographical, or other fields when running summary page generator 40. A special lexicon dictionary 195 is a supplemental lexicon dictionary that contains words from the regular lexicon dictionary 195 but with different weights than those used by regular lexicon dictionary 195, and/or contains additional words with assigned weights, usually related to a special technical field. In one embodiment, lexicon dictionary 195 has English-language words. In other embodiments, other languages are provided, with weight values chosen specifically for those languages (i.e., the individual word weights provided for an English-language lexicon dictionary 195 are generally not applicable for the literal translations of those words into other languages, since the importance of particular words in determining important concepts will vary across languages). The special weights for a special lexicon dictionary 195 override the weights normally provided by regular lexicon dictionary 195. These special weights in the special lexicon dictionary 195 provide special selection criteria which results in selection of key topics of special significance to the field of that lexicon dictionary 195. These special lexicon dictionaries 195 are activated by selecting the custom button 128, and then clicking an option box that will appear with titles like "legal," "business," "medical," "geographical" or other term that refers to a specific lexicon dictionary. Geographical names are an example of a special lexicon dictionary that has nominal value for generating some key topic lists and a great deal of value for other key topic lists. In one embodiment, a separate lexicon dictionary of such terms is selected and loaded into memory by summary page generator 40, where that lexicon dictionary is combined with the other words in regular lexicon dictionary 195. As a result, summary page generator 40 selects proportionally many more phrases as key topics which include words from the selected lexicon dictionary.

The author causes summary page generator 40 to actually generate the summary pages 62 and presentation pages 150, by clicking on RUN button 132, and exits summary page generator 40 by clicking on CLOSE button 134.

Figure 9A:
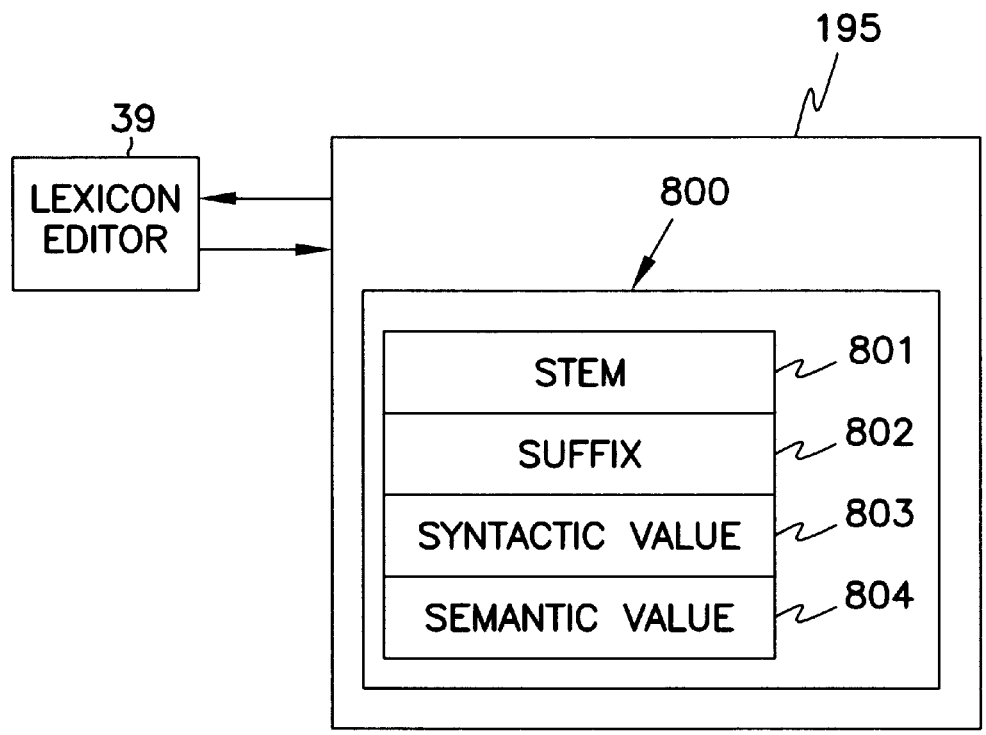
FIG. 9A shows an example IPF data structure for a word.

In one embodiment shown in FIG. 9A, lexicon editor 39, allows an author to create and edit lexicon dictionaries 195 which are appropriate to the author's needs. Lexicon editor 39 allows addition or deletion of words to/from dictionary 195, and allows changing the values of the weights for a given word, i.e., syntactic value 803 and semantic value 804. In one embodiment additional weighting value fields (similar to syntactic value 803 and semantic value 804) are provided for each word object 800 in order to handle particular language analysis situations. In one embodiment, summary page generator 40 includes lexicon editor 39.

The description of the present invention involves text. However, it should be realized that such text will likely occur in documents that include pictures, other graphics, charts, sound, video sequences and possibly other elements.

Summary page generator 40 generates summary pages 62 which contain key topic lists. A key topic list is a list of terms and associated hyperlinks which are used to hyperlink into a presentation page 150 derived from a source document 20. Four exemplary types of summary pages which are generated by one embodiment of summary page generator 40 are:

Table-of-Contents Headings: These key topics are identified by HTML heading tokens, which an author inserts into a document to provide information indicating one of six levels of headings. The headings are bracketed by the heading tokens <h1> . . . <h1/> through <h6> . . . <h6/>. In other embodiments, other tokens or formats are used to indicate such headings. The heading text is copied and assembled into a table-of-contents summary page 80. Table-of-contents summary page 80 is a page that contains a key topic list of headings from source documents 20 and hyperlinks into presentation pages 150 derived from where the headers appear in those source documents 20. One embodiment of summary page generator 40 allows the author to select up to six levels of headings at spinner 111 (i.e., if the author selects level 3, then heading levels 1, 2, and 3 are included in table-of-contents summary page 80). In another embodiment, summary page generator 40 selects the heading levels to be used. FIG. 8 shows the process of how summary page generator 40 compiles these headings, derived from source document 20, into key topic entries in table-of-contents summary page 80 with hyperlinks to the locations in the presentation page 150 (also derived from source document 20) that contains these headings. The hyperlinks generated by this process are shown in FIG. 3.

Abstracts: The document is scanned to find high semantic content sentences and certain syntactical formations within sentences.

These are treated as abstracts. In one embodiment, abstracts whose semantic content exceed the threshold value that the author selected will be listed in the abstract summary page 140 in the order in which they occurred in the text. An abstract summary page 140 is a page that contains abstracts that were automatically generated by summary page generator 40 from the source documents 20. In one embodiment, each abstract has exactly one source, and abstract entries are hyperlinked to the place they appear in presentation page 150.

In one embodiment, if horizontal hyperlinks are activated, entries in key-phrase summary page 100 can hyperlink into abstracts in abstract summary page 140.

Concepts: In one embodiment, all the abstracts listed in the abstract summary page 140 are scanned to identify concepts. In another embodiment, all the abstracts, whether or not listed in the abstract summary page 140, are scanned to identify concepts. 'Concepts' are the already-identified abstracts, but with the key phrases pulled out to act as 'headwords' (i.e., words placed at the beginning of a phrase in order to facilitate ordering, such as by alphabetizing). These key-phrase headwords are noun phrases or noun-verb phrases that contain high semantic weight words. While abstracts are each listed in abstract summary page 140 only once, concepts can have more than one significant, indexable phrase, and thus each concept is listed once for each separate key phrase. In one embodiment, significant concepts are assembled into a key-topic list and are inserted into concept summary page 200, where they are listed alphabetically according to the key-phrase headwords.

A concept summary page 200 is a page whose key-topic entries are key concepts and associated hyperlinks that were automatically generated from source documents. In identifying concepts, the document is automatically processed by summary page generator 40 to identify particularly high semantic weight key words. If the author includes medical or legal lexicon dictionaries, terms which are particularly significant to those fields are predominately selected.

Key phrases: Key phrases are phrases with a high semantic weight. The key phrase is rotated so that the first word will be the highest semantic weight noun or adjective: the word a person normally looks up. Key phrases are then assembled in alphabetical order a key-phrase summary page 100 and hyperlinked to the places they occur in a presentation page 150. A key-phrase summary page 100 is a page that contains a list of hyperlinked key phrases that were automatically generated from source documents.

In one embodiment, as source document 20 is parsed to locate key topics, the text (and other multimedia data, if any) is copied into presentation pages 150, and destination anchors are inserted into the text corresponding to each key topic placed into the key topic lists for summary pages 62. In this embodiment, if horizontal hyperlinks are enabled, destination anchors are also inserted into the appropriate summary pages 62 to enable later finding the locations of the identified key topics. Summary page generator 40 next scans summary page templates 154, one for each summary page 62 to be generated, to obtain information about how to lay out the corresponding summary page 62 (i.e., which icons to use, where to place the icons, etc.). In one embodiment, the author can modify the summary page templates 154. In one embodiment, a summary page template 154 is also used to provide a template for presentation pages 150.

Summary page generator 40 creates key topic entries with hyperlink source anchors in the appropriate summary pages 62 for the key topics that summary page generator 40 finds in the selected documents 20. Summary page generator 40 also creates a hyperlink from each key-topic entry in a summary page to an instance of that key topic in the presentation pages 150 by filling in a destination location specification 73 with the name of a destination anchor 74. If circular hyperlinks are being generated, then summary page generator 40 creates hyperlinks to the next instance of that key topic in the text for each key-topic instance.

One embodiment of the present invention allows defining of exclusion zones. Exclusion zones are sections of text that are passed over without attempting to recognize certain key topics or without inserting embedded anchors. Exclusion zones are used to avoid creating embedded hyperlinks to tables, quoted text or any text through which the author does not want to be hyperlinked. Exclusion zones, in one embodiment for example, include any text surrounded by the HTML preformatted text tokens:<PRE> . . . </PRE> which are standard HTML. In one such embodiment, some other non-standard tokes that are in the HTML compatible such as "<EXZ> . . . </EXZ>" are used to define exclusion zones.

Linguistic analyzer 42 is a computer program that does a linguistic analysis of the source documents in order to extract key topics. The Syntactica Engine™ is a linguistic analyzer used by one embodiment of the present invention. The operation of a linguistic analyzer is described below.

First, linguistic analyzer 42 scans the document and looks each word up in regular lexicon dictionary 195 and in any specialized lexicon dictionaries 195 that have been activated. For the purposes of the present invention, a lexicon dictionary is defined as a table of words from a natural language, such as English, each word of which has associated one or more semantic values or other information that can be accessed by computer programs. Linguistic analyzer 42 identifies and removes suffixes (such as "-ance," "-ability," "-ly" and "-ing") so that the stem form can be used. Thus the words "open," "opening," "openness" and "opens" and would all be treated as the same stem "open." In one embodiment, a different semantic weight is assigned based on the removed suffix; for example, more weight is assigned to "communications" than to "communication." In one embodiment, suffixes are removed before being looked up in regular lexicon dictionary 195. In another embodiment, the word is looked up in regular lexicon dictionary 195 whose entries specify both the stem and the suffix.

The linguistic analyzer translates the input document into a data structure, such as the Intelligent Paragraph Format that is shown in FIG. 9A. The Intelligent Paragraph Format (IPF) consists of word objects and paragraph objects. Each word object 800 contains a stem entry stem 801 (e.g., "open"), a suffix 802 (e.g., "-ing"), a syntactic value 803 (e.g., "15" for a singular noun), and a semantic weight 804. Each word object is generally obtained from a regular lexicon dictionary 195. One embodiment of regular lexicon dictionary 195 contains over 110,000 word objects 800, each word object 800 having its own syntactic value 803, semantic weight 804, and suffix 802.

In one embodiment, the syntactic value 803 of a word is an arbitrary code. In one embodiment, for example, adjectives are assigned the value of 1, adverbs 128, singular nouns 15, plural nouns 37. Some words can be different parts of speech and are assigned a value accordingly. For example, in "Time flies like an arrow, but fruit flies like bananas," the first word "flies" is a verb while the second word "flies" is a plural noun; the second word "like" is a verb, while the first is not. Similarly, while "invalid" or "adolescent" can be both nouns or adjectives (when they are used as nouns, they describe a human agency) and so are assigned a value 88 indicating they can act as both a noun and an adjective.

In one embodiment, the semantic weight of a word is a number between 1 and 63 which indicates the importance of the word's stem as an indexable quantity. A high value is assigned to specific words like "physiology" or "petroleum", and lower values to words like "phone" or "number" which are less specific and have less value for indexing. Words like "bedding" or "bedridden" have a very low semantic weight. The semantic weights assigned to words is largely a subjective determination based on experience.

Figure 9B:
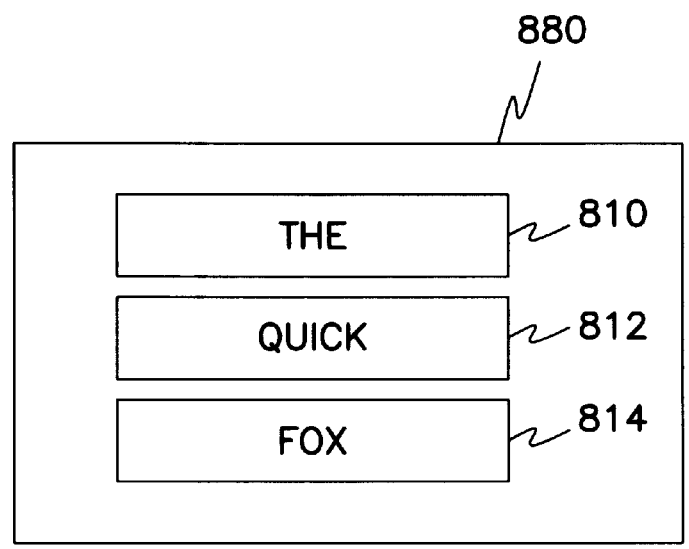
FIG. 9B shows an example IPF data structure for a paragraph.

In addition to the word objects, there are also paragraph objects in the IPF. One possible embodiment of the paragraph objects is shown in list 880 in FIG. 9B. List 880 is a list pointing to the word objects for the words "THE" word 810, "QUICK" word 812 and "FOX" word 814. The construct of "sentence" does not exist in the IPF; a period (.) is treated as a word just like any other word whose syntactic and semantic weights are to be found in regular lexicon dictionary 195. However a linguistic analyzer can extract sentences from the IPF formats. Paragraph objects determine the boundaries to the semantic analysis.

Referring to FIG. 8, HTML Formatter 50 first preprocesses a source document 20 into HTML document 52. Summary page generator 40 transforms the HTML document 52 throughout the HTML filter 41 which strips HTML encoding from the documents leaving only the textual content. Next, the Syntactica Application Program Interface (API) used in this embodiment of linguistic analyzer 42 constructs the IPF objects for the words and paragraphs of the source document using one or more lexicon dictionaries 195. Next the API scans the IPF objects of the source document, and creates IPF index objects 43 that will be used for the table-of-contents summary page 80, IPF key phrase objects 44 that will be used by the key-phrase summary page 100, IPF concept objects 45 that will be used by the concept summary page 200 and IPF abstract objects 46 that will be used by the abstracts summary page 140. The API also constructs an entry page 60.

The data base format is the previously described Intelligent Paragraph Format (IPF), where index entries are stored as single paragraph objects. Referring to FIG. 7, the author will have selected which of these object views to generate by selected the buttons 101, 103, 105 and 107 to determine which one of the summary pages 60, 80, 140 and 200 shown in FIG. 8 will be generated. The Syntactica API also generates a list of unknown words 56. Unknown words are words that the Syntactica API finds in the source documents but to do not appear in regular lexicon dictionary 195.

The linguistic analysis ignores suffixes and words which have very low semantic weights. Thus, index entries in a circular index could be semantically similar but lexically different. One embodiment keeps synonym information in the dictionary entries is regular lexicon dictionary 195 so that synonyms can be identified and various references to a set of synonyms could be found in a single dictionary entry. Thus, if the word "dog" and "canine" were entered as synonyms, summary page generator 40 could treat "dog" and "canine" as being targets of the same index entry. Thus a viewer looking up "dog" could also find a hyperlink to references to "canine". A related embodiment generates, under the index entry "dog", see "canine" and be hyperlinked to the index entry for "canine".

In order to identify key topics in a source document 20 for constructing the summary pages 62, the IPF documents are scanned to identify nouns whose semantic weight exceeds a user-controllable threshold value. Adjacent words are then scanned to see if they fit into a syntactic pattern for a noun phrase (or other linguistic phrase of interest). Thus adjectives preceding the noun, and prepositional phrases after a noun, are identified as part of the noun phrase. The phrase can then be given a semantic weight according to a formula based on the semantic weight and syntactic function of the words in the phrase. While one embodiment of summary page generator 40 recognizes noun phrases, other embodiments also recognize verb phrases, prepositional phrases or verb noun phrases. Verb phrases are generally useful in generating abstracts, but are not generally as useful for generating concepts or key phrases.

The author is able to control various parameters to affect the key-phrase entries selected. For example, special technical terms may appear in the text which are not found in regular lexicon dictionary 195. The author can either edit these words and their associated weights into regular lexicon dictionary 195 or create a new special lexicon dictionary containing them. Author customization, while not necessary, is useful, since customization enables an author to customize and run the key-phrase identification to their needs. The Syntactica Engine generates a list of unknown words 56—words which were found in the text but not in regular lexicon dictionary 195. The author can then add any or all of these words to regular lexicon dictionary 195 giving them semantic and syntactic values and then reprocess their documents and the updated regular lexicon dictionary 195.

Returning to FIG. 8, the Syntactica Engine API (Application Program Interface) 42 generates the summary pages 62 from the IPF for the source document 20. The index IPF objects are:

table-of-contents index list 43: The author selects a table-of-contents summary page 80 at box 101 in FIG. 7. The IPF paragraph objects for the source document 20 is scanned to find all the headings in a document. The number of heading levels output is specified by the spinner at 111, and is a number between 1 and 6. In one embodiment, the table-of-contents summary page 80 is the only summary page 62 that does not use the linguistic analysis of the Syntactica Engine used in linguistic analyzer 42. One embodiment of summary page generator 40 always generates all 6 heading levels rather than giving the user the ability to select the number of heading levels.

abstract index list 46: The author selects the abstract summary page 140 at box 107 in FIG. 7. Abstracts are listed in the order they appear within a document rather than an alphabetical order. To generate the abstracts summary page, the IPF objects are scanned to find all key topics whose value is greater than the Abstract threshold value selected at spinner 117. Rarely will there be more than one hyperlink to an abstract, as abstract views abstract the meaning from a longer span of text, and thus are usually unique.

concept index lists 45: The author selects the concept summary page 200 at box 105. Typically the author will select a concept threshold value at spinner 115 that is higher than the one for abstract objects. To generate the concept summary pages 200, the IPF objects are scanned to find all concept key topics whose value exceeds the concept anchor threshold 115. The concept key topics that exceed the threshold are rotated so that the noun with the highest semantic becomes the first word. Thus a phrase like "big black dog" is rotated to "dog, big black". In another embodiment, the concept key topic is not rotated. In one embodiment, the concept key topics are alphabetically ordered for display on concept summary page 200.

key-phrase index list 44: The author selects the key-phrase summary page 100 at box 103 to generate the key-phrase summary pages 100. The IPF objects are scanned to find possible key phrases. Those phrases that pass that threshold value selected at spinner 113 are rotated so that the noun with the highest semantic weight becomes the first word. In one embodiment, these are alphabetically ordered for display on a key-phrase summary page 100.

The author, by setting various parameters, causes shorter or longer, or more or fewer key phrases to be selected as indexes. Shorter key phrases typically provide more-general key phrases and so provide more indexes per key phrase, on average. Longer key phrases typically provide more specific key phrases and therefore fewer indexes per key phrase, on average. Which method is best is application specific and therefore is typically left under control of the author.

There are some detail differences between the abstract, concept, and phrase anchor view generation other than that specified by the selection of different threshold levels. Concept entries are derived from abstract entries. Key phrase entries are also derived from abstract entries, although in another embodiment, key phrase entries are derived directly from source documents 20.

Figure 2A:
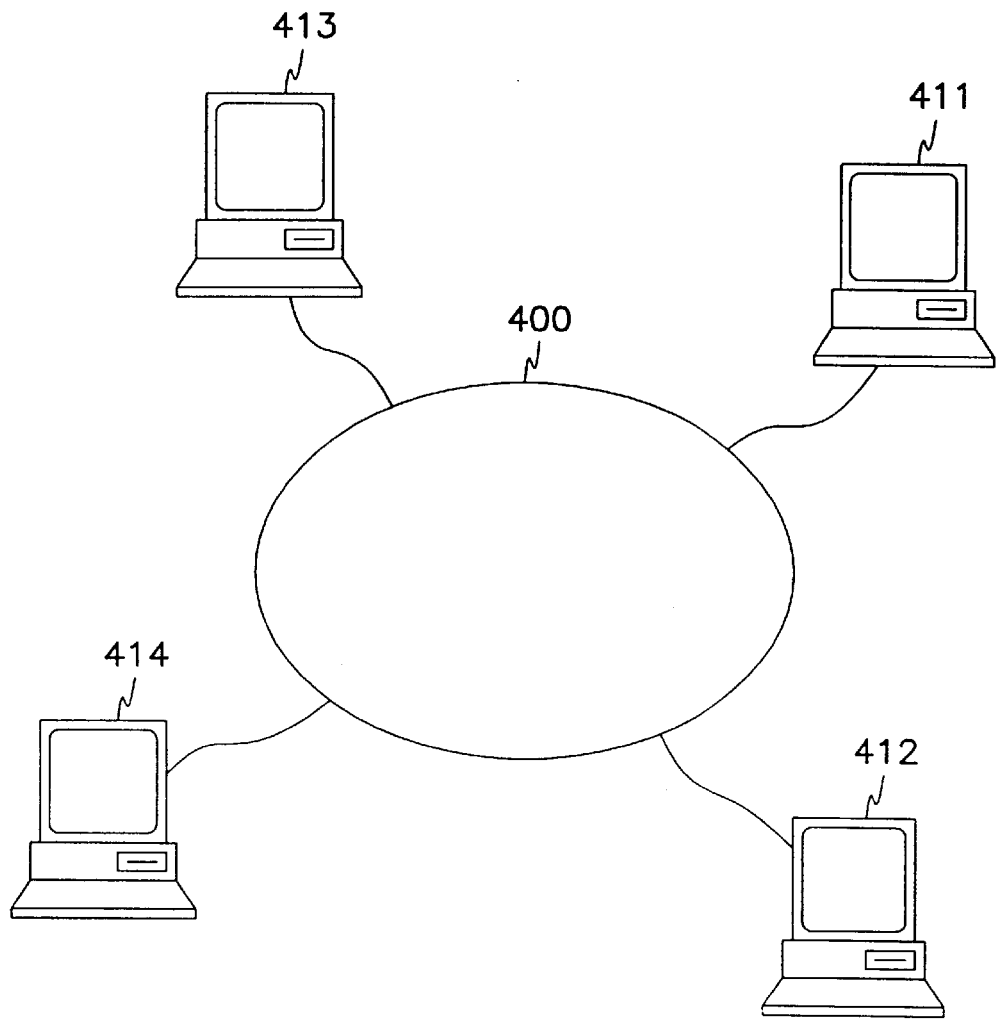
FIG. 2A shows a prior-art network connected to a plurality of computers.
Figure 2B:
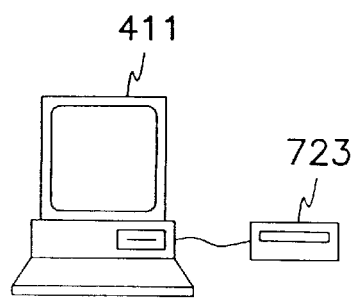
FIG. 2B shows a prior-art CD-ROM drive connected to a computer.

In one embodiment, source documents 20 are optionally segmented while generating presentation pages 150 in order to reduce the amount of text that must be downloaded from the database provider's computer 413 to the viewer computer 411 (see FIG. 2A). Thus the viewer can review one summary page 62 or presentation page 150, a page at a time, each of which requires only a limited bandwidth and can be downloaded quickly. In one embodiment, source documents 20 comprise N data files. Summary page generator 40 converts these into M presentation pages, wherein M>N. The M presentation pages include data from the original source documents 20, plus hyperlink anchors. M is determined by the density parameter provided by the author who run summary page generator 40.

At start-up time, the author specifies the segment size for pages by selecting a value with spinner 124 of the start-up screen. In one embodiment, the segment size is measured by the number of paragraphs—a paragraph being a string of text ending with a carriage return. The default setting is 15 paragraphs. When summary page generator 40 creates summary pages 62 and presentation pages 150 at step 47 in FIG. 8, summary page generator 40 divides the pages (i.e., output documents 64) that are larger than the segment size into segments no larger than the specified size. At the end of each such segment except the last, summary page generator 40 inserts an anchor containing a button and the token <NEXTSEG>. If the viewer clicks on the button, the next segment is downloaded to the viewer's computer and displayed. Similarly, an anchor containing a button and <PREVSEG> are inserted at the beginning of each segment except the first. When the viewer clicks on one of these buttons, the previous segment is downloaded into the local computer and displayed on the viewer's computer screen. In one embodiment, each segment is displayed independently, i.e., parts of two segments are not displayed on different parts of the same display screen at the same time.

In one embodiment, the web browser concurrently shows multiple windows containing summary pages 62 and/or presentation pages 150. Another embodiment modifies the web browser to combine the adjoining parts of adjacent segments for simultaneous and thus seamless display. On encountering the <NEXTSEG> or <PREVSEG> tokens, the web browser automatically downloads the next or previous segment into the viewer's computer and display them both seamlessly. This seamless display has two advantages. First, the seamless display eliminates the next segment and previous segment buttons and the associated viewer action. Second, the seamless display allows displaying parts of adjacent segments on the screen at the same time, thus hiding the segmentation from the viewer.

Once these paragraph objects for the summary pages have been created, an HTML document is created as shown in blocks 47 and 48. At block 47, summary page generator 40 generates summary pages by first loading a summary page template 154, usually a different one for each the summary pages and appends to that summary page template 154 the index list generated from their IPF objects for the specific summary page. Summary page template 154 provide the default boilerplate for a summary page 62. Next, hyperlinks insertion 48 in the HTML source document 52 is performed in order to generate the summary pages and the presentation pages 150. If horizontal hyperlinks option box 123 is selected, summary page generator 40 embeds a button indicating a horizontal hyperlink and a hyperlink to the first occurrence of the index in another other summary page for each index entry in the summary pages which has a horizontal hyperlink.

Each of the summary pages 62 may comprise several segments, only one of which may be loaded in the viewer's computer and be viewable at one time. This is suggested in FIG. 8, where the key-phrase summary page 100 comprises segments 361, 362 and 363. Similarly presentation page 150 may comprise many segments from different documents.

A summary page template 154 is an HTML document which has formatting information and boilerplate text.

In one embodiment, hyperlink insertion begins with pages which are in the IPF format. Outputting these pages from the IPF format to a summary page 62 and presentation pages 150 on a computer screen is a simple process. An HTML document is generated by scanning the IPF, one word at a time, and reconstructing and outputting the words. As each word is output to the presentation pages 150 (and summary pages 62, if horizontal hyperlinks are selected), the concept, key-phrase and abstract key-topic lists are scanned to identify places in the text where those key topics occur, so an anchor can be inserted.

Figure 10:
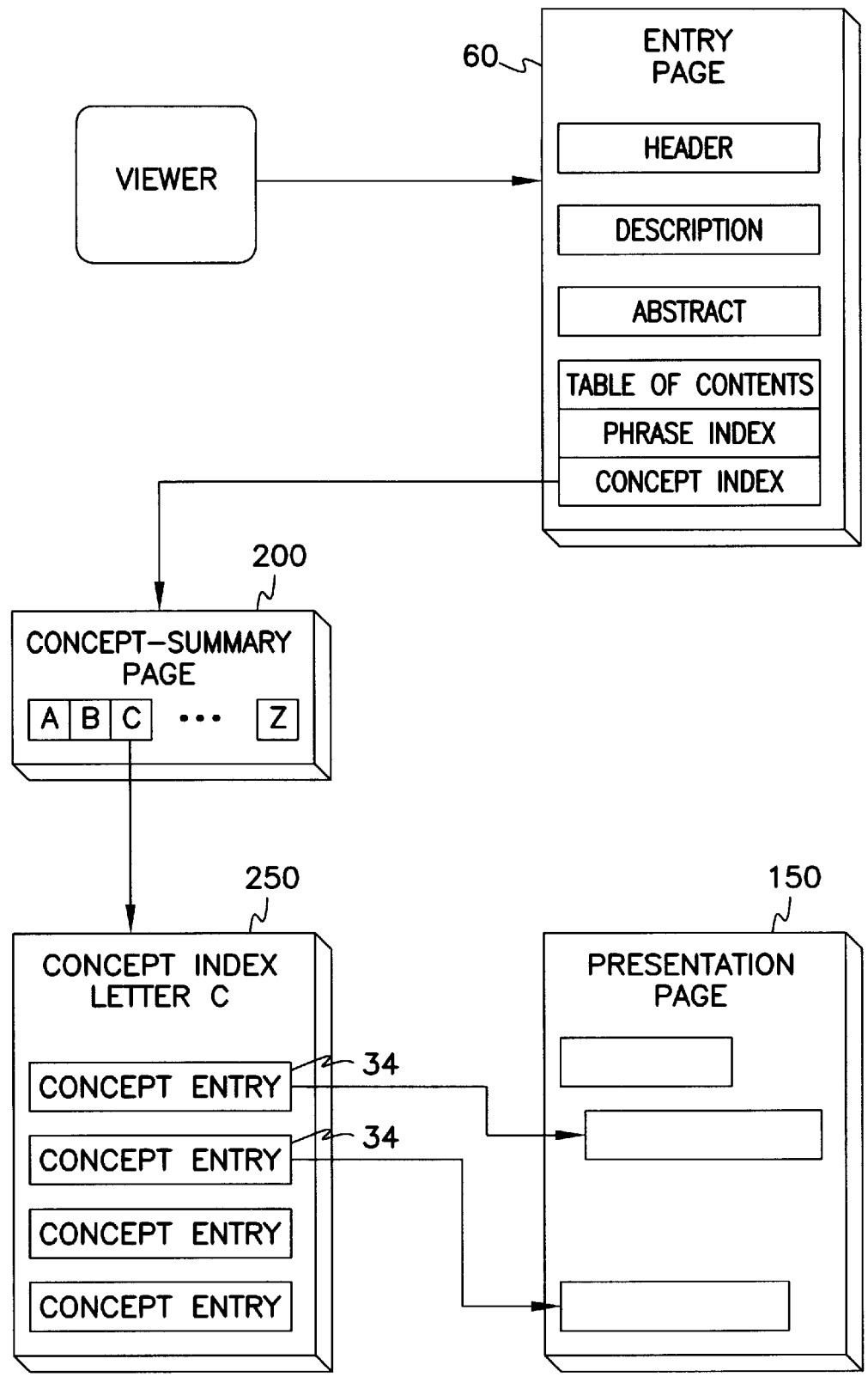
FIG. 10 shows the hyperlinking for 26 summary pages, one for each letter.

In one embodiment shown in FIG. 10, summary page generator 40 provides the ability to generate twenty-six or more secondary summary pages 250, one (or more) for each of the 26 letters in the alphabet. Secondary summary pages 250 are summary pages 62 which are inserted between one summary page 62 and the presentation pages 150. Secondary summary pages 250, or A-to-Z pages, are activated by selecting the box 109 or 126 shown in FIG. 7. If activated, twenty-six secondary summary pages 250, one for each letter, will be generated as is shown in FIG. 10. In one such embodiment, if a secondary summary page is filled, an additional secondary summary page is generated and hyperlinked to the full one. The concept summary page 200 lists the letters A to Z, rather than the concepts themselves, and each of these letters is hyperlinked to a summary page 62 for the entries beginning with the associated letter. For example, all concepts (or phrases) beginning with C are stored on a C secondary summary page 250. A-to-Z summary pages allow the viewer or author to more quickly find the entry they are looking for.

In an alternate embodiment, assuming there are N index entries to be hyperlinked to which form a summary page and E is the number of entries that would fit in the summary page (E corresponds to the 26 entries for A-to-Z pages), then every N/E index entry could be put on a summary page. If the viewer clicked on an entry in the summary page, the web browser would hyperlink to a secondary summary page where the hyperlinked-to entry would be the first item, and the entries that follow would be those entries between the selected phrase and the following one on the summary page 62.

A summary page template 154 can be used to define macro sequences which are expanded when referenced later in a document. For example, one could define the name PHRAS_AZ to represent the anchor on the summary page that would hyperlink to the Phrases A-to-Z page. PHRAS_AZ is defined as:

<!--PHRAS_AZ><A HREF=PHRASE_AZ.TPL> <IMGSRC="BUTTON.GIF"></A><!--/>

The above string defines PHRAS_AZ as a macro. String "<!--" starts the macro definition (note that the two hyphens "--" represent non-breaking spaces). PHRAS_AZ is followed by the name of the macro, "PHRAS_AZ", and a closing ">". The definition of the macro is "<A HREF=PHRASE_AZ.TPL><IMGSRC="BUTTONS.GIF"> </A/>" and the macro is terminated with: "<!--/>". "PHRAS_AZ" will be replaced by

"<A HREF=PHPASE_AZ.TPL> <IMGSRC="BUTTON.GIF"> </A>"

every place it appears later in the document.

Here, the effect is to create both a name of the hyperlink (HREF=PHRASE_AZ.TPL) and a button, whose image comes from the file "BUTTON.GIF", that will be displayed. Thus, the author can insert a simple statement <!--PHRASE_AZ!--/> in an HTML document output by summary page generator 40 to specify both the hyperlink, the A-to-Z summary page, and the button that activates it.

Summary Page Templates 154 and Tokens

Summary page templates 154 are HTML documents that define the layout features which are displayed from summary pages 62. With summary page templates 154, the author can indicate what types of hyperlinks the author would like to provide on each summary page 62 or presentation page 150 (to return from the presentation pages 150 to the entry page 60, for instance, or to return from any of the output pages in output documents 64 (see FIG. 8) to the author's server's home page), what icons or text the author would like to have serve as the anchor hot areas for those hyperlinks, and any other design features or text the author want to appear on a given type of output page. In one embodiment, default summary page templates 154 provide hyperlinks from each of the summary page templates 154 for summary pages 62 back to the entry page 78, hyperlinks to retrieve the previous segment and next segment of the current view, and added design features like horizontal rules to separate the icons from the data on the screen page. All of these design elements can be changed simply by editing the summary page templates 154.

In one embodiment, an installation program will create template subdirectories for each of the sets of summary page templates 154 used by summary page generator 40. The default summary page templates 154, for instance, are located in the DEFAULT subdirectory. During installation, icon files will be copied into the directory containing the summary page templates 154 with which they are associated. When the author runs summary page generator 40, the necessary icon files are copied from the template directory into the directory the author designates as the destination directory for the project in order that the image-source references will not require path names. This allows the author's projects to be portable as long as the author keeps all the project files together.

In one embodiment, each of the sets of summary page templates 154 contains eight templates. Template functions and default names are listed in Table 1 below.

TABLE 1

| Template Names | Functions |
| --- | --- |
| ANCHOR.HTM | Defines the entry page 60; |
| TOC.HTM | Defines the table of contents page 80; |
| PHRASEAZ.HTM | Defines the phrase A to Z page; |
| CONCPTAZ.HTM | Defines the concept A to Z page 200; |
| PHRASE.HTM | Defines the key phrase page 100; |
| CONCEPT.HTM | Defines the concept page 200; |
| ABSTRACT.HTM | Defines the abstract page 140; |
| PRESENT.HTM | Defines the presentation page 150; |

When editing summary page templates 154 or creating new ones, the author can retain the default filenames, in which case the author must store each template set in a separate directory, or the author can choose new template names. If the author chooses new template names, the author can use any legal DOS filenames, but the author must remember to indicate those new names in the initialization (e.g., AP.INI) file in order to make those summary page templates 154 active. (see Table 2, below for more information on one embodiment of the AP.INI file used with one embodiment of summary-page generator 40). Any legal DOS extension can also be used for templates, but if the author wishes to use a browser to view summary page templates 154 as they are worked being on, an ".HTM" extension should be used since many browsers will fail to read any other extension as an HTML document.

TABLE 2

The AP.INI File

The following elements can be set through the AP.INI file:

| | |
| --- | --- |
| NETSCAPE = {0 \| 1} | The NetScape browser has difficulty reading the escape sequence for a non-breaking space ( ). For full compatibility with the NetScape browser, set this line to 1 which will convert all non-breaking spaces in the templates and in the source data to the ASCII numerical escape sequence ( ). The NetScape browser seems |

TABLE 2-continued

The AP.INI File

The following elements can be set through the AP.INI file:

| | |
| --- | --- |
| | to handle this just fine. Default setting is 0. |
| SKIP_DOCUMENT = {0 \| 1} | If set to 1, then summary-page generator 40 will simply skip any document in which it finds the HTML to be too faulty to read. If set to 0, then summary-page generator 40 will display an error message and terminate processing under this condition. Default setting is 1. |
| HTML_WARNINGS = {disk \| display} | All warnings are currently sent to disk rather than display. |
| HTML_WARNINGS_FILE = | The name of the file to which warnings are sent. The default name is HTML.WAR. |
| HTML_FILE_EXT = | Sets the extension for all output files. The default is .HTM. |
| PP_SEGMENT = "" | The base filename for Presentation segments. Each segment of the Presentation View will have a filename which begins with this base name, is followed by integers, and ends with the extension declared in the HTML_FILE_EXT variable, as in SPP23.HTM. The base name must be surrounded by quotes and should be kept, on long documents especially, fairly short. The base name is also case sensitive. This will not matter on DOS, but if you are planning on moving the output files to a server with a case-sensitive operating system you should make the case of your base names the same as the case the filenames will have on that operating system. The Link Case option on the interface will override this setting. Default base name is "SPP". |
| PAP_SEGMENT = "" | The base filename for Phrase segments. See note under PP_SEGMENT. Default base name is "SPAP." |
| CAP_SEGMENT = "" | The base filename for Concept segments. See note under PP_SEGMENT. Default base name is "SCAP." |
| AAP_SEGMENT = "" | The base filename for Abstract segments. See note under PP_SEGMENT. Default base name is "SAAP." |
| TOC_SEGMENT = "" | The base filename for Table of Contents segments. See note under PP_SEGMENT. Default base name is "STOC." |
| PHRASE_AZ_PAGE = "" | The filename for the Phrase A to Z page. This page is not segmented, so as many as 8 characters can be used. The extension indicated in the HTML_FILE_EXT variable will be used here as well. The quotation marks are necessary. The default filename is "PAPAZ." |
| CONCEPT_AZ_PAGE = "" | The filename for the Concept A to Z page. See note under PHRASE_AZ_PAGE. The default filename is "CAPAZ." |
| HOME_PAGE = "" | The filename for entry page 60. See note under PHRASE_AZ_PAGE. The default filename is "HOME." |

One embodiment of the present invention also provides other alternative template sets for the author to choose from (e.g., Fancy, plain, etc.).

Template Sets and Icons: Viewing the Alternatives

One embodiment also provides a template master, TEMPLATE.HTM, that the author can use to view the various template sets used by summary page generator 40 and the icons associated with those template sets. To view template sets, the author's browser is directed at TEMPLATE.HTM. The template sets are listed as primary menu items. Under each template set, the author will find an anchor for "Icons" and an anchor for "Templates." Choosing "Icons" will jump the author to a page in which all the icons associated with the template set are laid out on a single page for comparison. In some cases these icon sets will include extra icons that are not in use in the template set as it is currently laid out. These extra icons are provided so that the author can substitute them for any of the icons in the set without losing continuity of appearance.

Choosing "Templates" will jump the author to the summary page template 154 for the entry page 60 of that template set. The author can choose any of the source anchors 75 on the entry page 60 to travel to other templates in the set, and the author should be able to navigate the entire template set in the same way that the end user will be able to navigate the final output documents 64 produced by the templates.

In this embodiment, the layout of these summary page templates 154 will accurately represent the layout of the pages in output documents 64 they will produce with three exceptions:

| | |
|---|---|
| • Data - | Where data will be filled in at run time, the templates will have a simple data token and a comment indicating that this location is reserved for data |
| • Run-time tokens - | Certain tokens cannot be assigned a physical location on the output page until after the data has been filled in. For example, the horizontal link icon will generally come at the end of a line of data, which will only be placed on the page at run time. The "location" of these tokens on the template is irrelevant since their eventual location on the output pages is hard-coded in the software; they appear on the templates only in order to define the icons that will be used. On the templates used in one embodiment, these tokens appear near the bottom of the template. |
| • Return to Master - | At the bottom of each template is a double horizontal rule and an anchor marked "Return to Template Master." These elements appear only on the templates and will not be transferred to the output pages. |

Template Sets: Changing the Active Templates

In one embodiment, when the author runs summary page generator 40, the template parser will look in the directory specified as the Template Directory in the Directory dialog box for summary page templates 154 with the filenames listed in the AP.INI file. Changing the active template set is a simple matter of specifying a new directory.

Designing Output Pages with Templates

One difficulty in HTML, especially for new users, is visualizing how the HTML document being edited will appear when seen through a browser on the web. This difficulty is easily overcome by using a browser as an integral part of the editing process. Before beginning to edit a summary page template 154, the author points the browser at that template to open it. The browser is left open, and the computer is switched to an editor, and the desired changes to the template are made. At any point during the editing process, the author can save the document being worked on, switch back to the browser, click on Reload, and immediately see the results of the editing.

In one embodiment, each of the summary page templates 154 contains instructions for the design and layout elements of the page it describes. The template ANCHOR.HTM, for instance, determines the layout of the entry page 60; PRESENT.HTM determines the layout of the presentation pages 150. A typical layout instruction on the PRESENT.HTM might look like this:

<!--RETAP--><A HREF="ANCHOR.TPL">
<IMG SRC="SMANCR.GIF"></A><!--/RETAP-->

Most of this will seem familiar to HTML users. What will be unfamiliar here is the use of HTML comment codes (<!-- -->) to create special tokens, in this case the "Return to Anchor page (i.e., entry page 60)" token, <!--RETAP-->. These tokens are necessary in one embodiment because of the special dilemma posed by templates. When creating most web pages, the author is working with static anchors and static text; the author knows exactly what text will be on the page, which allows placement of anchors precisely where the author wishes to have them appear. When working with summary page templates 154, the author is creating an "empty" form which will be filled in at run time with variable text—the output documents 64 produced by summary page generator 40—and the author must set anchors in a position that is relative to this variable text. This requires that the author indicate for summary page generator 40 which type of output goes on which page and which anchor should be associated with it. All this is accomplished by means of tokens. The next section will discuss these tokens in detail, and then a fuller discussion of editing templates is provided.

Tokens

Tokens are placeholders for data that cannot be filled in until run time. In some cases this data will be the actual output of summary page generator 40; in some cases it will be the filenames of files that are created at run time. Tokens are placed within HTML comment codes so that they will not be visible when a browser is used to examine the templates. This allows the templates to accurately reflect how the final output pages of output documents 64 will look. One embodiment uses four primary categories of tokens:

Link destination tokens

These tokens determine the destination point of a hyperlink. For instance, in any project large enough to be broken into segments, the various segments (i.e., presentation pages 150) of the Presentation View will have a Next Segment and Previous Segment icon. The hyperlink destination token will determine precisely where on the next segment or previous segment the hyperlink will lead the user. Typically, these tokens will be placed at the top of the template so that the hypertext jump will lead the user to the top of the output page.

The hyperlink destination tokens are:

| | |
|---|---|
| TOPLINK | Marks the anchor destination for a direct hyperlink to one of the summary pages 62. If the source anchor on entry page 60 is "Table of Contents," then clicking on it will cause a jump to wherever this destination token has been placed on the table of contents template. |
| NEXTLINK | On segmented pages, this marks the destination of the jump caused by clicking on "Next Segment." |
| PREVLINK | On segmented pages, this marks the destination of the jump caused by clicking on "Previous Segment." |

Link source tokens

These tokens mark the source anchor of a hyperlink, where it will be placed on the page and what form it will take, whether it will be an icon or a text string. This information could be placed on the template in non-token form, writing a regular HTML href to create a hyperlink from the key phrase pages 100, for instance, to the entry page 60. But if, in the next suite of documents, the template names were changed, all the handwritten hrefs would be invalid and would have to be edited manually. Using a token to create this hyperlink (the token specifies "create a hyperlink between the key phrase pages 100 and the entry page 60, whatever they are called in this suite"), saves that extra work.

Link source tokens are:

| | |
|---|---|
| NEXT | Defines the "Next Segment" source anchor. |
| PREV | Defines the "Previous Segment" source anchor. |
| RETAP | Defines the "Return to Anchor page (i.e., entry page 60)" source anchor. |
| PAP | Defines the "Phrase View" source anchor. Appears only on the Anchor page (i.e., entry page 60) template. |
| PAPAZ | Defines the "Phrase A to Z" source anchor.2 Appears only on the Anchor page (i.e., entry page 60) template. |
| CAP | Defines the "Concept View" source anchor. Appears only on the Anchor page (i.e., entry page 60) template. |
| CAPAZ | Defines the "Concept A to Z" source anchor. Appears only on the Anchor page (i.e., entry page 60) template. |
| AAP | Defines the "Abstract View" source anchor. Appears only on the Anchor page (i.e., entry page 60) template. |
| TOC | Defines the "Table of Contents View" source anchor. |

Appears only on the Anchor page (i.e., entry page 60) template.

Run-time tokens

These are tokens which can be defined on the template, but whose precise position on the page cannot be set until run time because they are data-dependent. The horizontal hyperlink icon, for instance, will come at the end of a phrase or concept entry, and this entry is not created until run time. As a matter of convenience, run-time tokens are typically placed at the bottom of the template, but in fact their exact position is irrelevant. Run-time tokens are:

| | |
|---|---|
| PHRASECIRC | Defines a phrase circular hyperlink. |
| CONCEPTCIRC | Defines a concept circular hyperlink. |
| HORZ | Defines a horizontal hyperlink. |
| AAPICON | Defines the icon that will be placed at the beginning of an abstract entry as its anchor. |

Data tokens

These are placeholders for the output data that will be produced at run time. The data tokens are:

| | |
|---|---|
| DATA | Placeholder for output data. |
| CITE | Placeholder for the filename cited at the bottom of output pages. |

The tokens and their functions for one embodiment of the present invention are listed in Table 3 below. With the exception of the data tokens, these are all paired set tags; that is, a token beginning is marked with an "on" tag such as <!--horz--> and the end is marked with an "off" tag such as <!--/horz-->. Everything between these two tags is considered part of the token declaration. In addition to the token name, token location is also part of this token declaration. The data token, when placed on the Abstract View template, is read by the template parser as standing for "abstract view data"; on the Presentation View template it is read as "Presentation View data." A token placed on a template where it would have no meaning (e.g., a data token placed on the template for entry page 60 of FIG. 8) is ignored.

TABLE 3

Token Names and Functions

| Name | Type | How it functions |
|---|---|---|
| PHRASECIRC | Run-time | Defines a phrase circular hyperlink. |
| CONCEPTCIRC | Run-time | Defines a concept circular hyperlink. |
| HORZ | Run-time | Defines a horizontal hyperlink. |
| AAPICON | Run-time | Defines the icon that will be placed at the beginning of an abstract entry as its anchor. |
| DATA | Data | Placeholder for output data. |
| CITE | Data | Placeholder for the filename cited at the bottom of output pages (this is an optional token that can be omitted. It is provided as a convenience for administrators so that if they see an error they can more easily find its source). |
| TOPLINK | Destination | Marks the anchor destination for a direct hyperlink to one of the Anchor pages (i.e., entry pages 60). If the source anchor on the Anchor page (i.e., entry page 60) is "Table of Contents," clicking on it will cause a jump to wherever this destination token has been placed on the table-of-contents template. |
| NEXTLINK | Destination | On segmented pages, this marks the destination of the jump caused by clicking on "Next Segment." |
| PREVLINK | Destination | On segmented pages, this marks the destination of the jump caused by clicking on "Previous Segment." |
| NEXT | Source | Defines the "Next Segment" source anchor. |
| PREV | Source | Defines the "Previous Segment" source anchor. |
| RETAP | Source | Defines the "Return to Anchor Page (i.e., entry page 60)" source anchor. |
| PAP | Source | Defines the "Phrase View" source anchor. |
| PAPAZ | Source | Defines the "Phrase A to Z" source anchor (typically the "Phrase View" source anchor is the same as the "Phrase A to Z" source anchor. Only one of these is used on any given project, depending on the options you have selected. The same is true for the "Concept View" and the "Concept A to Z" anchors). |
| CAP | Source | Defines the "Concept View" source anchor. |
| CAPAZ | Source | Defines the "Concept A to Z" source anchor. |
| AAP | Source | Defines the "Abstract View" source anchor. |
| TOC | Source | Defines the "Table of Contents View" source anchor. |
| APCOMMENT | Comment | This allows you to place a comment in a template without having that comment transferred to the output pages. |

Token Format

All tokens other than data tokens and comment tokens use the same format, as follows:

<!--TOKENNAME--> X <A HREF="FILENAME.HTM"> Y </A>Z <!--/TOKENNAME-->

The token begins with the token name placed within an HTML comment (<!--TOKENNAME-->) so that it will not be visible when the template is viewed through a browser. The template will, therefore, be very close in appearance to the output page it is intended to produce. This gives direct visual feedback when editing the templates. The token ends with a token off comment (<!--/TOKENNAME-->). Everything between these two comments will be considered a part of the token definition.

The "X" after the first comment marks the "pre" area of the token. Any legal HTML can be placed here, including plain text; it will be inserted in the output page immediately before the anchor defined for this token. This is useful if, for instance, an icon is being defined as an anchor and it is wished to have it preceded by a horizontal rule, or perhaps by a paragraph mark so that it always begins a new line.

The next section of the token marks the beginning of the anchor and the hypertext reference for the destination of that anchor. This is standard HTML, though it is used slightly differently here. The "FILENAME.HTM" is actually a placeholder in terms of token function. At run time, the template parser will replace this "dummy" filename with a valid output filename. All the hrefs in the templates could, in fact be set to HREF="LOCAL" or HREF=FAKENAME and it would have no effect on the functionality of summary page generator 40.

On the templates used in this embodiment, however, double duty is obtained out of this placeholder. If in the above example the token were, in fact, <!--RETAP-->, which is the token for returning to the entry page 60, then the destination in the href is made into the Anchor template (see the examples in the section "Editing Templates"). This will allow the author, when viewing the template currently being edited through a browser, to click on the "Return to Anchor page (i.e., entry page 60)" icon and be taken to the Anchor template. In this way, one can navigate through the template set just as one will be able to navigate through the final output set.

The "Y" after the destination anchor is the "mid" area of the token. Whatever is placed here will become the source anchor for the jump.

Most often this will be an icon or some sort of explanatory text. The </A> that follows the mid area closes the anchor.

The "Z" marks the "post" area of the token. As in the "pre" area, any legal HTML can be placed here, including plain body text. This is helpful if there is some design element one wishes to have always associated with the source anchor; if, for instance, one wishes to have it followed by a line break or a horizontal rule. Most of these design elements can also be added to the template itself, outside the token, but there are occasions, especially with run-time tokens, when it is most convenient to have the design element a part of the token. The AAPICON token, for instance, is the token which defines the icon to be used as the anchor for entries on the Abstract View. One may decide that the appearance of the Abstract View is best when there are two spaces inserted between the icon and the first word in the entry. In this case, one could simply add two non-breaking spaces (special characters which the word processor uses to specify that the word before and the word after the non-breaking spaces should both be placed on the same line, rather than breaking at the end of a line between them) in the post area of the token declaration.

Comment tokens are also paired set tokens, but they function much more simply and thus have a much simpler form:
<!--APCOMMENT--> . . . comment . . . <!--/APCOMMENT-->
This token is provided so that one can place comments in summary page templates 154 and not have them transferred (even as comments) to the output page. Everything between the comment "on" and comment "off" codes is considered part of the comment by summary page generator 40. The entire expression will be ignored by the template parser at run time.

Data tokens, because they act only as placeholders, have an even simpler form:
<!--DATA--> or <!--CITE-->
At run time, the data token will be replaced by the appropriate HTML output data for that page. The citation token, if chosen, will be replaced by the filename of the output document 64.

Tokens for the Alphabet

Tokens for the alphabetical characters on the Phrase A to Z page and the Concept A to Z page take the same general form as other source tokens, except in the case of alphabetical characters where two distinct source anchors must be defined for each character. When processing small documents separately, or when processing documents at a very high Selection Threshold, there will likely be occasions when there are no entries for some letters of the alphabet. This absence of data is indicated with the secondary source anchor for each letter. The token for the letter "H" on the Concept A to Z page might take the form:
<!--CAPLET=H--><A HREF="CONCPTAZ.TPL">H</A> (H)<!--/-->
The opening comment <!--CAPLET=H--> indicates which letter is being defined. As with other source anchors, the href statement is actually a placeholder that will be replaced at run time. In the above example, this href points to the Concept A to Z template as a matter of convenience for editing the templates. The "mid" area indicates the anchor to be used when entries for this letter exist. In this case, a simple capital H is used. Any icon or text character combination can be designated as the anchor. The "post" area indicates the anchor to be used when no entries for the letter exist. Here, a capital H in parentheses is being used. Once again, any icon or character combination can be designated here.

Tokens for letters on the Phrase A to Z are identical except that they begin <!--PAPLET=H-->.

Editing Templates

The following example explains editing templates. In this section, several basic templates are shown and how they can be edited to incorporate various design elements is described.

Sample Template: The Entry Page 60

In one embodiment, a template for a basic entry page 60 would include, at a minimum, the following:
1   <HTML><HEAD><title>AnchorPage</title></HEAD><BODY>
2  <!--TOPLINK-->
3  <!--PAPAZ--><A HREF="PHRASEAZ.HTM">Phrases</A><P><!--/PAPAZ-->
4   <!--PAP--><AHREF="PHRASE. HTM">Phrases</A><P><!--/PAP-->
5         <!--CAPAZ--><A HREF="CONCPTAZ.HTM">Concepts</A><P><!--/CAPAZ-->
6  <!--CAP--><A HREF="CONCEPT.HTM">Concepts</A><P><!--/CAP-->
7  <!--TOC--><A HREF="TOC.HTM">Table of Contents</A><P><!--/TOC-->
8  <!--AAP--><A HREF="ABSTRACT.HTM">Abstract</A><!--/AAP--><P>

9  <a href="http://www.iconovex.com/HOMEPAGE.HTM"><IMG SRC="ICONHOME.GIF" ALIGN=MIDDLE ALT=RETURN></A><STRONG>Iconovex Home Page</strong>
10 </BODY></HTML Line 1 inserts standard HTML tags to indicate the beginning of an HTML document, beginning and end of the head, beginning and end of the title, and the beginning of the body text. These tags are necessary not only so that the template itself will be in proper HTML form (some browsers are rather finicky and will not read HTML properly if some of these tags are missing), but also so that the final output entry page 60 will be in proper HTML form.

Line 2 is the "toplink" token. Whenever a user clicks on a "Return to Anchor page (i.e., entry page 60)" token on one of the other output pages, they will be jumped to the location of this token. Most often, as in this case, this token will be placed at the very top of the template.

Line 3 is the "Phrase A to Z page" token and line 4 is the "Phrase View" token. Only one of these tokens (or neither) will be read by the parser at run time, depending on the options selected: if a Phrase A to Z page is being generated, the "Phrase A to Z" token will be read; if Phrase View is being generated, but not a Phrase A to Z page, then the "Phrase View" token will be read. If no Phrase View is being generated, both of these tokens will be ignored.

The hrefs that follows the token declarations are, as discussed earlier, simple placeholders that will be replaced at run time with the appropriate filenames. In the meantime, however, the name of the appropriate template file is used as the source anchor. This is what allows the templates to be hyperlinked in the same fashion as the eventual output pages they will create.

Following the source anchor is the single word "Phrases" that will become the hot word on the output page. In the "post" area, after closing the anchor, is a paragraph mark which ensures that the next token will begin on a new line. Note that the paragraph mark might also have been added to the template outside of the token. One could rewrite the lines to read:

<!--PAPAZ--><A HREF="PHRASEAZ.HTM">Phrases</A><!--/PAPAZ--><P><!--PAP--><AHREF="PHRASE.HTM">Phrases</A><!--/PAP--><P> or

<!--PAPAZ--><A HREF="PHRASEAZ.HTM">Phrases</A><!--/PAPAZ--><P><!--PAP--><AHREF="PHRASE.HTM">Phrases</A><!--/PAP--><P>

However, since one of these tokens is ignored at run time, this will leave an extra paragraph mark which can, under some circumstances and with some browsers, produce an extra, unintended space. If the paragraph marks are placed within the token tags, so that they become part of the token definition, one of them will always be ignored at run time.

Lines 5 and 6 are the "Concept A to Z" token and the "Concept View" token respectively. These lines parallel the structure and function of lines 3 and 4. Lines 7 and 8 are the "Table of Contents" token and "Abstract" token respectively.

Line 9 defines an icon (ICONHOME.GIF) as an anchor for a jump to the home page of the Iconovex Corporation server. Line 10 closes the body text and HTML. As with the opening lines, these lines are added to maintain proper HTML form on both the template itself and on the output pages it will produce.

One embodiment of this template includes definitions for icons and other added layout elements. The HTML for such a modified template looks like this:

1  <HTML><HEAD><title>AnchorPage</title></HEAD><BODY>
2  <!--TOPLINK-->
3  <H2><img src="ANCR.GIF" ALIGN=MIDDLE>The Anchor Page</H2>
4  <HR>
5  <strong>Please choose one of the following Synopsis Views of the document:</strong><P>
6  <!--APCOMMENT--> Please note that only one of the following tokens for Phrases and one of the tokens for Concepts will be used at run-time, depending on whether or not one is creating an A-to-Z page. The same icon has been chosen to be used in either case, but different icons can be used to indicate whether an A to Z page exists, if desired. <!--/APCOMMENT-->
7  <!--PAPAZ--><A HREF="PHRASEAZ.TPL"><IMG SRC="LTHOUSE.GIF" align=middle alt="Phrases">Phrases</A>  <!--/PAPAZ-->
8  <!--PAP--><A HREF="PHRASE.TPL"><img src="LTHOUSE.GIF" ALIGN=MIDDLE alt="Phrases">Phrases</A>  <!--/PAP-->
9  <!--CAPAZ--><A HREF="CONCPTAZ.TPL"><IMG SRC="BULB.GIF" align=middle alt="Concepts">Concepts</A>  <!--/CAPAZ-->
10 <!--CAP--><A HREF="CONCEPT.TPL"><img src="BULB.GIF" ALIGN=MIDDLE alt="Concepts">Concepts</A>  <!--/CAP-->
11 <!--TOC--><A HREF="TOC.TPL"><IMG SRC="SHIP.GIF" align=middle alt="Table of Contents"> Table of Contents</A>  <!--/TOC-->
12 <!--AAP--><A HREF="ABSTRACT.TPL"><img src="GLOBE.GIF" ALIGN=MIDDLE alt="Abstract">Abstract</A><!--/AAP-->
13 <P>
14 <hr>
15 <a href="http://www.iconovex.com/HOMEPAGE.HTM"><IMG SRC="ICONHOME.GIF" ALIGN=MIDDLE ALT=RETURN></A><STRONG>Iconovex Home Page</strong>
16 <!--apcomment--><hr><hr><a href="../template.htm" align=middle>Return to Template Master</a><!--/APCOMMENT-->
17 </BODY></HTML>

In line 3 a decorative icon and caption has been added followed by horizontal rule (line 4). In line 5 body text is added. In this case, it has been chosen to be brief, but explanatory notes can be added here about the document or documents being presented.

Line 6 constitutes a template comment. At run time the template parser will ignore everything between the "comment on" token (<!--APCOMMENT-->) and the "comment off" token (<!--/APCOMMENT-->). This token should be used whenever it is desired to place something on the template that is not wanted to be transferred to the output pages. In this case, the ent is used to add some explanatory text about the templates themselves.

Lines 7 through 15 are essentially the same as in the previous example except that here icons have been added for the source anchors and those icons have been lined up horizontally across the page rather than vertically down it by removing the paragraph tags. The non-breaking spaces in the "post" area of each token definition are to space the icons more evenly across the page. At line 14 a horizontal rule has also been added to separate the primary content of the page from the navigational icon at the bottom.

Line 16 makes a slightly different use of a comment token. Here, two horizontal rules and a source anchor are included for the template master (TEMPLATE.HTM) within the token. The anchor to the template master is provided so that one can easily navigate between template sets when viewing them in a browser. It is enclosed in comment tokens so that it will not be transferred to the final output pages.

Sample Template: The Presentation Page

A very basic Presentation page template might include the following:

1  <!--APCOMMENT--><HTML><HEAD><TITLE></TITLE></HEAD><BODY><!--/APCOMMENT-->
2  <!--NEXTLINK-->
3  <!--PREVLINK-->
4  <!--RETAP--><A HREF="ANCHOR.TPL"><IMG SRC="SMANCR.GIF"></A><!--/RETAP-->
5  <!--PREV--><A HREF="PRESENT.TPL"><IMG SRC="PREV.GIF"></A><!--/PREV-->
6  <P>
7  <!--DATA-->
8  <P>
9  <!--NEXT--><A HREF="PRESENT.TPL"><IMG SRC="NEXT.GIF"></A><!--/NEXT-->
10 <!--APCOMMENT--></BODY></HTML><!--/APCOMMENT-->

The first line in this example is peculiar to presentation page 150. At run time, summary page generator 40 will look at the source documents for the "Open Head" (<HEAD>) and "Close Head" (</HEAD>) tags, and will transfer all the information between these tags directly to the appropriate Presentation pages. In the process it will also write all the appropriate HTML tags to open and close the document and the body text. None of this information, therefore, needs to be included on the templates (and will, in one embodiment, confuse summary page generator 40 if it is included). However, if these tags were not included on the template in some form, many browsers would not be able to properly view the template itself. The solution here is to provide the tags for the template within comment tokens. In this way, the browser can read the tags and thus read the template correctly, but the template parser will not transfer the tags to the output pages.

Line 2 is a destination anchor. If a user is viewing the previous segment of the Presentation View and clicks on the "Next Segment" anchor, he or she is jumped to this destination. On the first page of any given project (where there can be no "Next Segment" anchor preceding it) or on a project which is not broken into segments, this token is simply ignored. Normally this token is placed at the top of the template. Note that the "toplink" token is not used on the Presentation page since summary page generator 40 provides no source anchors for direct jumps to the top of this view of the document.

Line 3 is also a destination token, in this case the destination of a jump made when a user clicks on the "Previous Segment" anchor located on a following page. This token is ignored on the last segment of any project and on projects that are not broken into segments.

These first two tokens mark destinations on the output pages, but do not produce any visible indicators on those pages.

The token on line 4 will produce the first visible element on the output pages. This is the "Return to Anchor page (i.e., entry page 60)" token, and the icon for that anchor, SMANCR.GIF, will appear in the upper left corner of the output page. No explanatory text or caption is attached to the icon.

Line 5 is the "Previous Segment" token. In this case the icon PREV.GIF is placed immediately to the right of SMANCR.GIF and serves as the anchor for the jump to the previous segment.

The paragraph tag after the "Previous Segment" token adds a blank line and ensures that the output data, which will replace the data token in line 7, begins on a new line. The paragraph tag after the data token has the same effect at the end of the output data.

Line 9 is the "Next Segment" source token, and the icon NEXT.GIF, which is designated here as the anchor for that token, will be the last element on the presentation page. Line 10 is another comment token, in this case used to formally close the body text and HTML. These tags are placed inside a comment token for the same reasons as Line 1.

These ten lines of HTML on the template will produce a presentation page 150 of which the exact appearance is browser-dependent. This is a fully functional presentation page 150, with everything the user needs to navigate through the document, but it is not particularly distinguished in its aesthetic appeal. Below is an example of how the template might be edited to incorporate a few simple design elements into the final output page.

1  <!--APCOMMENT--><HTML><HEAD><TITLE></TITLE></HEAD><BODY><!--/APCOMMENT-->
2  <!--NEXTLINK-->
3  <!--PREVLINK-->
4  <!--RETAP--><A HREF="ANCHOR.TPL"><IMG SRC="SMANCR.GIF" ALIGN=MIDDLE></A><STRONG>Return to Anchor page</STRONG>&NBSP;<!--/RETAP-->
5  <!--PREV--><A HREF="PRESENT.TPL"><IMG SRC="PREV.GIF" ALIGN=MIDDLE></A><STRONG>Previous Page</STRONG><!-/PREV-->
6  <HR>
7  This is a full-text facsimile of the original document. This symbol, <A HREF="LOCAL">P</A>, indicates a circular hyperlink. Clicking on this hyperlink will take the viewer to the next occurrence of the same phrase.
8  <P>
9  <!--DATA-->
10 <P>
11 <HR>
12 <A HREF="HTTP ://WWW.ICONOVEX.COM/HOMEPAGE.HTM"><IMG SRC="HOME.GIF" ALIGN=MIDDLE><STRONG>Iconovex Home Page</STRONG>&NBSP;&NBSP;
13 <!--NEXT--><A HREF="PRESENT.TPL"><IMG SRC="NEXT.GIF" ALIGN=MIDDLE></A><STRONG>Next Segment</STRONG><!--/NEXT-->
14 <BR>
15 <!--CITE-->
16 <!--PHRASECIRC-->P<!--/PHRASECIRC-->
17 <!--CONCEPTCIRC-->C<!--/CONCEPTCIRC-->
18 <!--APCOMMENT--><hr><hr><a href="./template.htm"align=middle>Return to Template Master</a><!--/APCOMMENT-->
19 <!--APCOMMENT--></BODY></HTML><!--/APCOMMENT-->

This example begins by placing the comment token and destination anchors in the same location as in the earlier example. The "Return to Anchor page (i.e., entry page 60)" token is next, but here we've added a few elements to that token. The text "Return to Anchor page (i.e., entry page 60)" has been added as a bold caption, aligned with the middle of the icon. In the "post" area we've added a non-breaking space so that the next icon won't push up against the ion from this one.

Line 5 is the "Previous Segment" token with the same changes as were made to the "Return to Anchor page (i.e., entry page 60)" token except that a non-breaking space has not been added here, since this icon is the last element on the line.

In line 6 a horizontal rule is added to separate the navigational icons from the text on the page. Immediately below that horizontal rule some explanatory text has been placed that will appear at the top of each segment. (It's important to keep in mind that with hypertext, unlike linear text, the user may enter the document at any point by any number of routes and that any explanatory text or other notes that would normally be necessary at the beginning of a linear text should be placed at the beginning of each segment of hypertext.)

At line 8 a paragraph tag is added to separate the boilerplate text from the output data which will replace the data token at line 16. At lines 17 and 18 a paragraph tag and a horizontal rule are placed to separate the data from the navigational icons that will appear at the bottom of the segment.

In lines 12 through 13 anchors for returning to a server's home page and for retrieving the next segment of the document are placed. The form for these tokens is identical to the source tokens used at the top of the template.

Once again non-breaking spaces are added between the icons to separate them some.

At line 14 a break tag is added to start a new line without adding blank space, and after that a citation token is placed so that the filename will appear in the lower left corner of the segment. This is the final visual element defined for the output pages.

Lines 16 and 17 are run-time tokens for phrase circular hyperlinks and concept circular hyperlinks respectively. These tokens are purely "definitional" in function; they describe what will be used for the anchor for their respective hyperlinks, but they do not affect the location of the anchor. These tokens can be placed anywhere on the template, and are grouped at the bottom in this case simply for convenience. Since only one type of circular hyperlink can be used in any given project, it would not be necessary to define both of them, but by doing so one can change options at run time and not have to edit the templates again.

Line 18 are identical to the "template master" lines used on the Anchor page (i.e., entry page 60) template; they are here only as a navigational tool for the templates and are not transferred to the output pages. Line 19 formally closes the body text and HTML on the template.

Integration Within a Word Processor as a Tool

Conventional word processor programs (WPPs), such as WordPerfect or Word for Windows often include an index-generation program, wherein a user manually inserts "index codes" at points within the text of a document where the user wants the index to point. An index code specifies information to the word-processor program (such as an index term phrase, which is listed in an index—usually alphabetically—for a later user to look up, and a location which is used by the word-processor program to generate a page number or other reference) in order that the WPP can generate an index. In conventional word processor programs, the user would have to determine which portions of the document comprised key topics in order to determine where the index points would be, and would have to manually enter the term which would be used in the index. A process running in the word processor program would then scan the document to determine the locations of each index code relative to page breaks, and thus generate an index (which it often appended to the end of the document) containing the terms entered by the user and a page-number cross-reference into the document.

Referring again to FIG. 3 (which shows the flow from source document 20 through summary page generator 40 to resultant documents 64.) As noted above, in its most general form, summary page generator 40 is a program running on a computer which automatically analyzes textual data in a source document 20, and using weighting rules determines from the textual data what are the most significant phrases (i.e., strings of words), and generates a presentation page 150 which contains textual data from source document 20 plus special codes embedded in that textual data, the codes which specify to another program (in this embodiment, a word-processor program) where those significant phrases are.

In one embodiment, the present invention is integrated as a built-in or add-on feature (sometimes called a "tool") into a conventional word processor program, such as WordPerfect or Word for Windows. Such a tool is usable from within the word processor without resort to switching to another program. Two examples of such tools are the spell-checker and the spreadsheet tools which are sometimes available within word-processor programs.

One such embodiment of the present invention is an indexing tool available within a word-processing program which, when activated by the user, automatically identifies key topics and phrases in a document's text, and inserts identifying index codes for the index-generation program into the word-processor document, for later use by the word processor program to generate an index to those key topics. In particular, one such embodiment automatically identifies semantically important key topics within an integrated word-processor environment, inserts index codes, and generates an index which contains cross-references from the index to each occurrence of the subject identified. In one such embodiment, the cross references are hyperlinks which are "activatable" when a viewer electronically views the document. The present invention thus scans a document from within a word-processor program, automatically identifies significant key topics in the document, and creates and inserts index codes for these key topics, alleviating the author from having to use mental steps to identify the key topics and manually enter the index code and the term to be used within the index entry.

One embodiment facilitates a process wherein the author later reviews and can edit the index codes inserted. This allows the author to fine-tune the resultant index by manually adding or removing index codes. The word processor program then processes the resultant document to generate the resultant index by conventional means. In one embodiment, the index contains hyperlinks to take a viewer of the computer-stored document from an index term in the index to the location in the document which cause the generation of that index term.

Appendix A shows the pertinent program code for one implementation of such an index-generation embodiment which does not involve hyperlinks, used to provide an embedded index-generation feature into the Microsoft WORD for Windows Version 6 word-processor program available from Microsoft Corporation. This Appendix A code provides a set of macros which add an "INDEXICON" option to the "TOOLS" menu for WORD. The INDEXICON option, when activated by a user, then invokes a automatic text-analysis program similar to that described above for the key-phrase page generation, but instead automatically inserts index tokens into the source document which are later recognized and processed by the word-processor program in order to generate an index of the source document. In one embodiment, comment tokens are also inserted into the source document in order to identify which index tokens were inserted by the index-generation feature, and to distinguish those index tokens from those which may have been manually inserted by a human user.

In one embodiment, the final document is stored on a computer-readable medium, such as magnetic disk storage, CDROM, or a network such as the Internet.

One embodiment of the present invention includes a process running in a word-processor program on a computer which (a) allows an author to select index generation for a document being processed (edited) and then, using a semantic analyzer program running on a computer, (b) automatically identifies significant key topics within the document, (c) generates and embeds index codes into the text of the document. The index codes are later used to generate an index which cross-references each term or phrase in the index to the location within the document which explains that term or phrase. In one embodiment, the cross references are hyperlinks which are used by a document-viewing program (such as a web browser program, a word-processor program, or other browser program capable of showing a viewer the hot areas of the source anchors and hyperlinking to the destination anchors when the viewer clicks on a hot area).

In another embodiment, the cross reference is a numeric or alphabetic indication is provided to the viewer which enables the viewer to go to the referenced destination by using that indication, such as the viewer would using a conventional index.

In one embodiment, a single integrated computer program takes a conventional computer-stored document as input and provides the viewer with an indexed and/or hyperlinked view of a semantically-analyzed form of that document, wherein the viewer can view, scan forward and backward, search for text strings as in a conventional text-viewing program, as well as having semantically important key topics marked and indexed, and having hyperlinks between the index and key topics and/or between key topics as marked in the text of the document.

In one embodiment, the index contains abstracts as explained above. In another embodiment, the index contains concepts, as explained above. In yet another embodiment, the index contains key topics, as explained above. In yet another embodiment, the index contains multiple parts, each part containing one or more of the just-listed types of index terms.

Another aspect of the present invention is a program, or a process within a program, which converts a document from a given conventional mark-up language, such as might be used or output from a conventional word processor program such as WordPerfect or Word for Windows, into HTML. HTML is the preferred language of the World-Wide Web; however, since HTML is only a half-dozen years old, there are relatively few documents in HTML form. Many major word-processor programs provide options for saving files in "Rich-Text Format" ("RTF"). RTF uses the standard ASCII character set to record the stylistic features of a document, in order that those features can be preserved with the document when the document is transported by a path which recognizes only the simple ASCII character set (e.g., a path such as most e-mail), or when the document is being ported from one word processor to another. One such embodiment recognizes the following RTF style indicators and converts them into the appropriate HTML tokens:

Headings 1 though 6,
Body paragraphs,
Special characters (e.g., &, <, >, and non-breaking space),
Character emphasis styles (e.g., bold, italic, and underscore),
Bullet lists, and
Number lists.

In one embodiment, only headings marked with style tags are recognized and converted, and headings set off with manual styles are not handled.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for creating an index tag in a computer document from within a word-processor program comprising the steps:

invoking an automatic text-analysis program from within the word-processor program;

performing automatic semantic analysis of text within the document using the text-analysis program;

generating an index term using the text-analysis program; and inserting into the document an index tag having an indication of the index term which was generated by the text-analysis program.

2. The method according to claim 1 further comprising the step of:

inserting a comment tag having an indication that the index term was generated by the automatic text-analysis program.

3. The method according to claim 1, wherein the step of performing automatic semantic analysis of text includes the step of determining meaning of a word.

4. The method according to claim 1, wherein the step of performing automatic semantic analysis of text includes the step of determining meaning of a word; and further comprising the step of:

inserting a comment tag having an indication that the index term was generated by the automatic text-analysis program.

5. The method according to claim 1, further comprising the step of:

identifying a first key topic in said first document, wherein said identifying said first key topic step includes semantically analyzing text in said document with a computer program.

6. A tool for a word-processor program, the word-processor program capable of processing a first computer-readable document, the tool comprising:

means for identifying a first key topic in said first document, wherein said means for identifying said first key topic includes means for analyzing text in said first document with a computer program;

means for inserting a first source anchor associated with said first key topic into a list; and means for creating a hyperlink between said first source anchor and said first key topic in said first document.

7. The tool according to claim 6, wherein the means for analyzing text further comprises means for semantically analyzing text in said first document with a computer program.

8. The tool according to claim 6, wherein said list is an index.

9. The tool according to claim 8, wherein said index is appended to an end of said first document.

10. The tool according to claim 6, further comprising means for generating a second computer-readable document, wherein said second document comprises hypertext markup language (HTML) tokens and at least some textual information from said first document.

11. The tool according to claim 10, wherein said first document comprises rich text format (RTF) tokens.

12. A storage medium having a computer program stored thereon for causing a suitably programmed information system to create an index tag in a computer document from within a word-processor program by performing the following steps when such program is executed on the system:

performing automatic semantic analysis of text within the document using the text-analysis program;

generating an index term using the text-analysis program; and inserting into the document an index tag having an indication of the index term which was generated by the text-analysis program.

13. The storage medium of claim 12, wherein the computer program comprises programming for further causing the system, when such program is executed on the system, to perform the following additional step:

inserting a comment tag having an indication that the index term was generated by the automatic text-analysis program.

14. The storage medium of claim 12, wherein the step of performing automatic semantic analysis of text includes the step of determining meaning of a word.

15. The storage medium of claim 12, wherein the step of performing automatic semantic analysis of text includes the step of determining meaning of a word, and wherein the computer pro gram comprises programming for further causing the system, when such program is executed on the system, to perform the following additional step:

inserting a comment tag having an indication that the index term was generated by the automatic text-analysis program.

\* \* \* \* \*